US011754786B2

(12) United States Patent
Wu

(10) Patent No.: US 11,754,786 B2
(45) Date of Patent: Sep. 12, 2023

(54) MULTI-FIBER SPLICE PROTECTOR AND CABLE ASSEMBLY WITH INTRA-CONNECTOR SPLICES, AND FABRICATION METHOD

(71) Applicant: CORNING RESEARCH & DEVELOPMENT CORPORATION, Corning, NY (US)

(72) Inventor: Qi Wu, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/499,289

(22) Filed: Oct. 12, 2021

(65) Prior Publication Data

US 2022/0137296 A1 May 5, 2022

Related U.S. Application Data

(60) Provisional application No. 63/107,015, filed on Oct. 29, 2020.

(51) Int. Cl.
*G02B 6/255* (2006.01)
*G02B 6/38* (2006.01)

(52) U.S. Cl.
CPC ........... *G02B 6/255* (2013.01); *G02B 6/3849* (2013.01); *G02B 6/3885* (2013.01); *G02B 6/38875* (2021.05); *G02B 6/3846* (2013.01)

(58) Field of Classification Search
CPC .. G02B 6/255; G02B 6/38875; G02B 6/2551; G02B 6/2558; G02B 6/4403
See application file for complete search history.

(56) References Cited

U.S. PATENT DOCUMENTS

| 5,231,688 | A | 7/1993 | Zimmer |
| 5,367,591 | A | 11/1994 | Seike et al. |
| 5,832,162 | A | 11/1998 | Sarbell |
| 5,971,624 | A | 10/1999 | Giebel et al. |

(Continued)

FOREIGN PATENT DOCUMENTS

| CN | 105717576 A | 6/2016 | |
| DE | 4122603 A1 * | 1/1993 | ............. G02B 6/255 |

(Continued)

OTHER PUBLICATIONS

European Patent Application No. 21204881.3, European search report, dated Mar. 28, 2022; 09 pages; European Patent Office.

*Primary Examiner* — Eric Wong

(57) ABSTRACT

A multi-fiber splice protector comprises a strength member including opposing first and second walls connected along only edge, and including unconnected opposing first and second wall extensions. The splice protector has a compact width that permits it to be incorporated with multiple fusion splice optical fibers in a multi-fiber push-on (MPO) type connector utilizing conventional MPO components. Protected splice joints may be provided between a multi-fiber ferrule and a boot of a connector, with at least a portion of a split jacket section of a fiber optic cable arranged within the boot. The jacket may have a split length of less than 25 mm and/or an entirety of the split jacket is within the boot. If provided, heat shrink tubing covering the split jacket may have a reduced length and/or may be confined within the boot.

34 Claims, 17 Drawing Sheets

(56) References Cited

U.S. PATENT DOCUMENTS

| | | |
|---|---|---|
| 6,738,555 B1 | 5/2004 | Cooke et al. |
| 6,869,227 B2 | 3/2005 | Del et al. |
| 7,461,981 B2 | 12/2008 | Yow et al. |
| 8,678,670 B2 | 3/2014 | Takahashi et al. |
| 8,702,326 B2 | 4/2014 | Faulkner et al. |
| 8,740,479 B2 | 6/2014 | Shitama et al. |
| 9,167,626 B1 | 10/2015 | Wu |
| 9,604,261 B2 | 3/2017 | Wu |
| 10,018,782 B2 | 7/2018 | Wu |
| 10,197,746 B2 | 2/2019 | Childers et al. |
| 10,353,154 B2 | 7/2019 | Ott et al. |
| 11,131,811 B2 | 9/2021 | Wu |
| 2016/0116683 A1 | 4/2016 | Murashima et al. |
| 2016/0139341 A1 | 5/2016 | Morioka et al. |
| 2016/0170154 A1* | 6/2016 | Lu .................... G02B 6/4403 385/78 |
| 2018/0024294 A1* | 1/2018 | Wang .................. G02B 6/2558 385/78 |
| 2019/0137689 A1 | 5/2019 | Filipowicz et al. |
| 2020/0012047 A1 | 1/2020 | Wu |
| 2020/0081218 A1* | 3/2020 | Wu ..................... G02B 6/368 |
| 2021/0116661 A1* | 4/2021 | Wang .................. G02B 6/2558 |
| 2021/0302656 A1 | 9/2021 | Wu |
| 2022/0163722 A1* | 5/2022 | Wu ..................... G02B 6/2558 |

FOREIGN PATENT DOCUMENTS

| | | |
|---|---|---|
| JP | 55-129305 A | 10/1980 |
| WO | 2018/037078 A1 | 3/2018 |
| WO | 2020/219477 A1 | 10/2020 |

\* cited by examiner

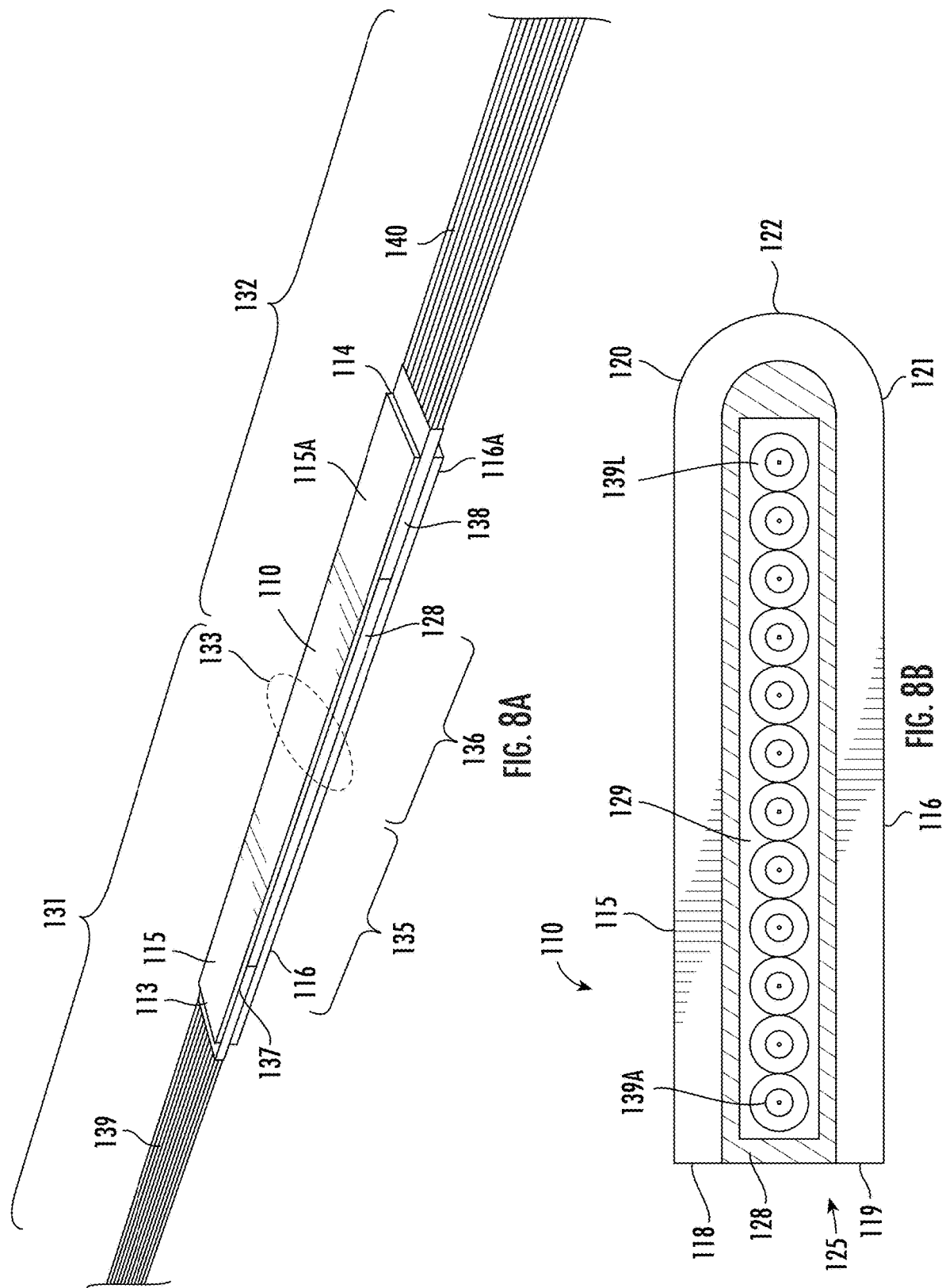

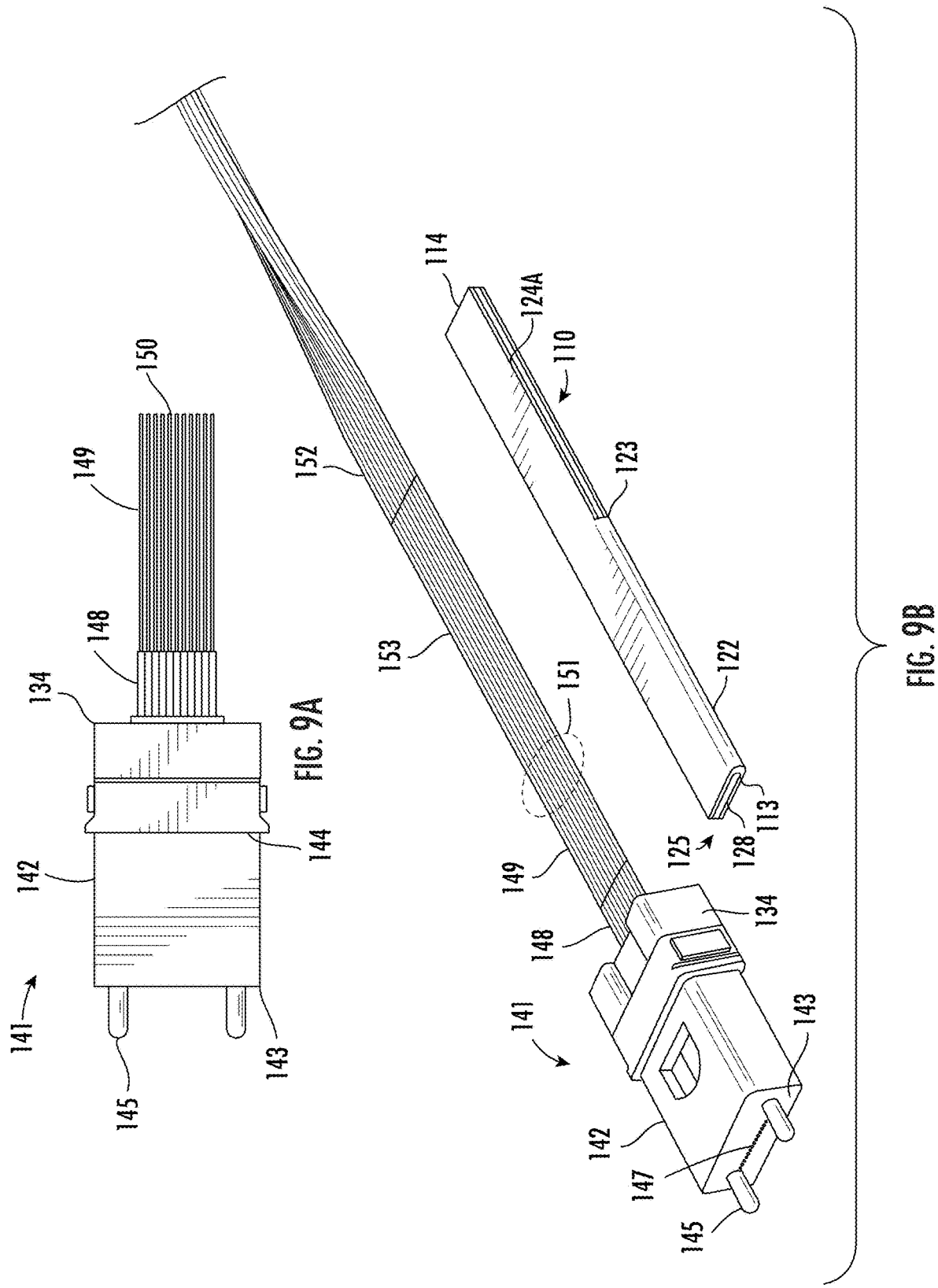

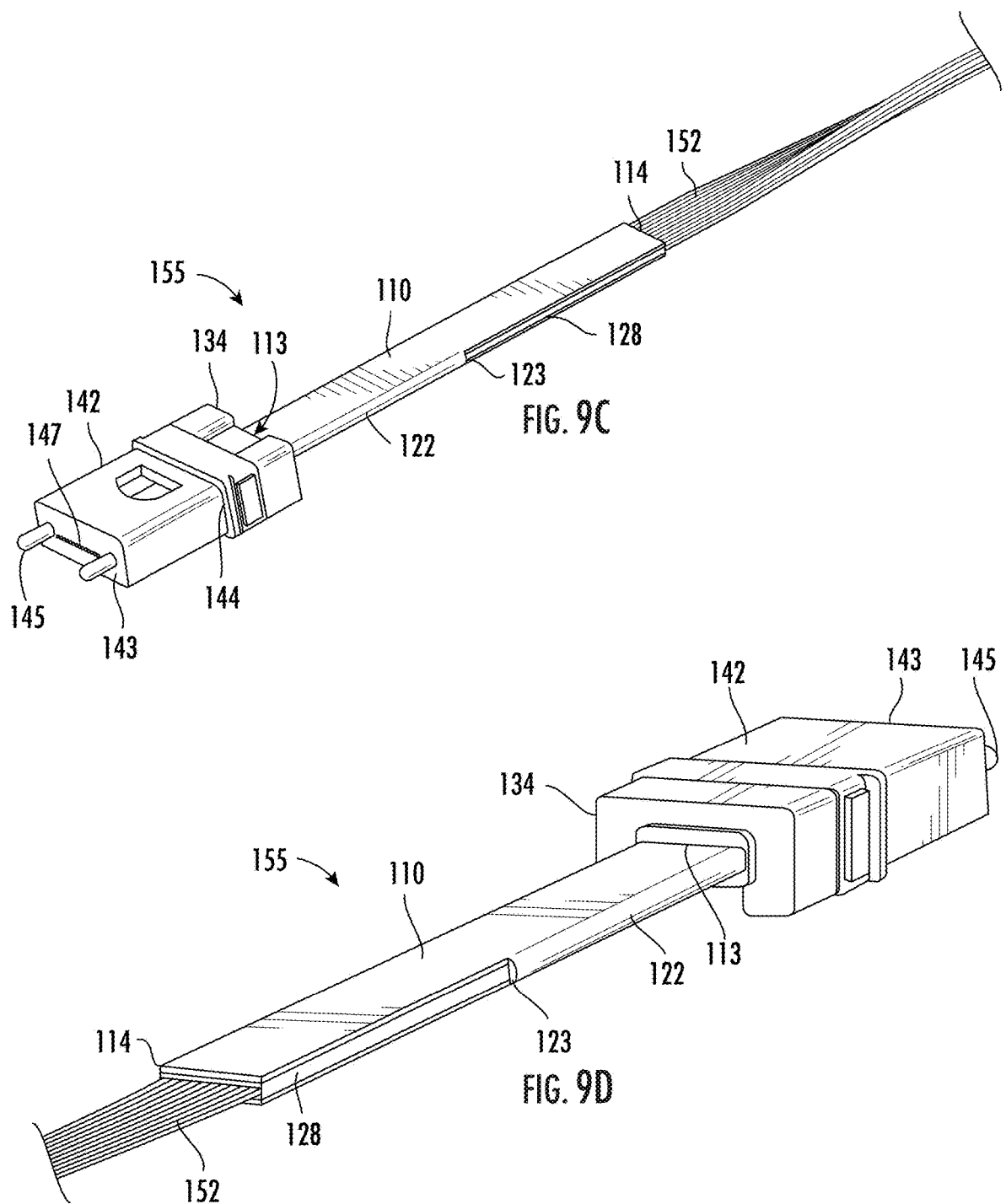

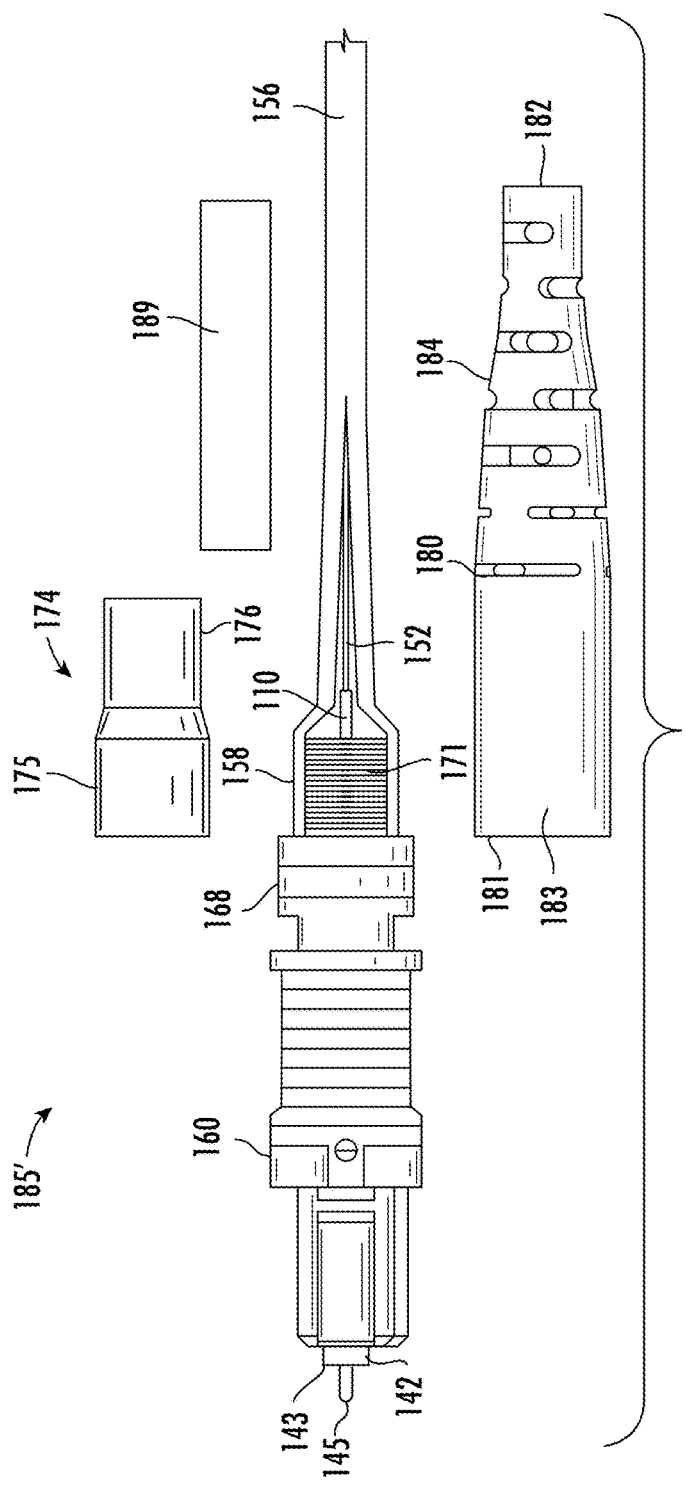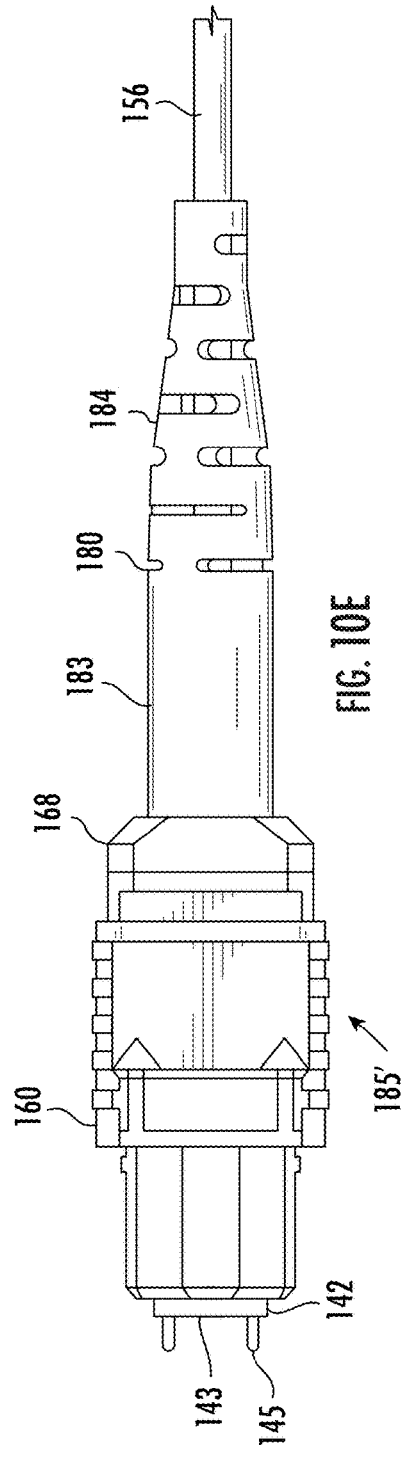
FIG. 10D
FIG. 10E

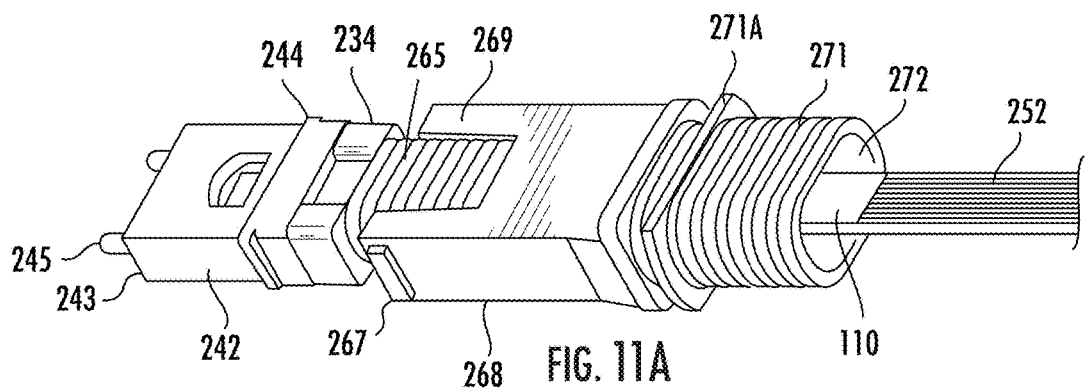
FIG. 11A
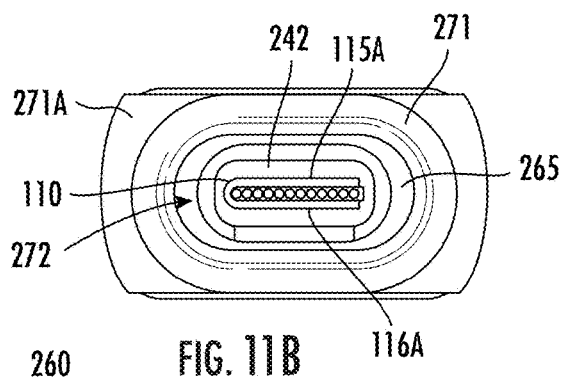
FIG. 11B
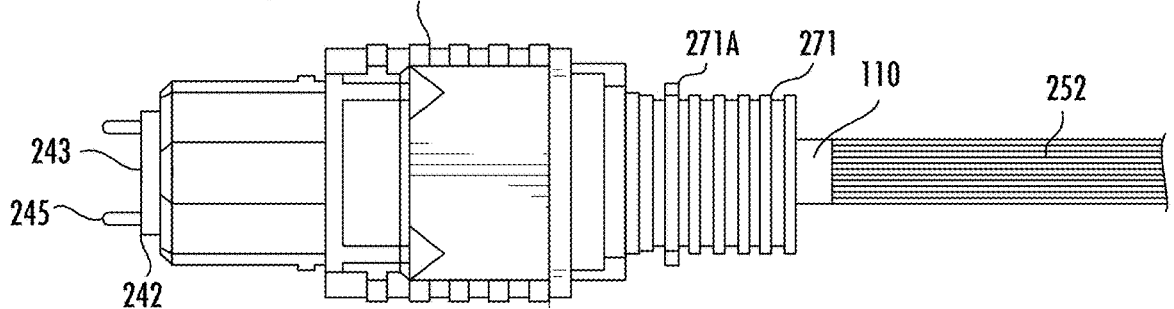
FIG. 11C
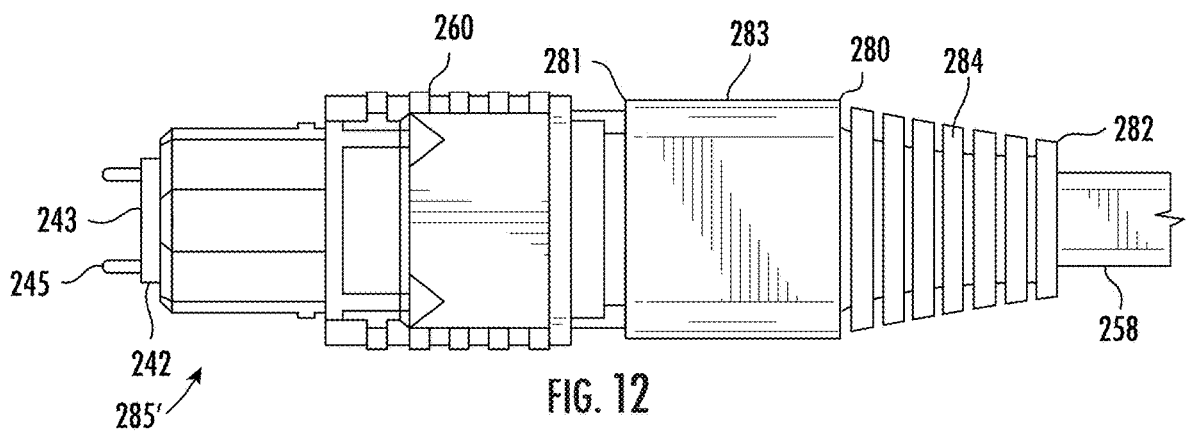
FIG. 12

MULTI-FIBER SPLICE PROTECTOR AND CABLE ASSEMBLY WITH INTRA-CONNECTOR SPLICES, AND FABRICATION METHOD

PRIORITY APPLICATION

This application claims the benefit of priority of U.S. Provisional Application No. 63/107,015, filed on Oct. 29, 2020, the content of which is relied upon and incorporated herein by reference in its entirety.

BACKGROUND

The disclosure relates generally to fiber optic splice protectors and fiber optic cables assemblies incorporating multiple fusion splices within connectors, in addition to methods for fabricating such assemblies.

Optical fibers are useful in a wide variety of applications, including the telecommunications industry for voice, video, and data transmission. Fiber optic cables are frequently produced by extruding thermoplastic material (e.g., polyvinylchloride (PVC)) over at least one coated optical fiber.

FIG. 1 is a cross-sectional view of an exemplary coated optical fiber 10 that includes a glass core 12, glass cladding 14 surrounding the glass core 12, and a multi-layer polymer coating 20 (including an inner primary coating layer 16 and an outer secondary coating layer 18) surrounding the glass cladding 14. The inner primary coating layer 16 may be configured to act as a shock absorber to minimize attenuation caused by any micro-bending of the coated optical fiber 10. The outer secondary coating layer 18 may be configured to protect the inner primary coating layer 16 against mechanical damage, and to act as a barrier to lateral forces. The outer diameter of the coated optical fiber 10 may be about 200 µm, about 250 µm, or any other suitable value. Optionally, an ink layer (e.g., having a thickness of about 5 µm) may be arranged over the outer secondary coating layer 18 of the coated optical fiber 10 to color the fiber (e.g., as is commonly used in ribbonized optical fibers), or a coloring agent may be mixed with the coating material that forms the outer secondary coating layer 18. An additional covering (not shown), which may be embodied in a tight buffer layer or a loose tube (also known as a furcation tube or fanout tube), may be applied to the coated optical fiber 10 to provide additional protection and allow for easier handling, wherein the resulting buffered or furcated optical fibers typically have an outer diameter of about 900 µm.

In this disclosure, the term "optical fiber" (or "fiber") will be used in a generic sense and may encompass bare optical fibers, coated optical fibers, or buffered optical fibers, as well as optical fibers including different sections corresponding to these fiber types, unless it is clear from the context which of the types is intended. "Bare optical fibers" (including "bare glass optical fibers") or "bare sections" are those with no coating present on the fiber cladding. "Coated optical fibers" or "coated sections" include a single or multi-layer coating (typically an acrylic material) surrounding the fiber cladding and have a nominal (i.e., stated) diameter no greater than twice the nominal diameter of the bare optical fiber. "Buffered optical fibers" or "buffered sections" are coated optical fibers with an additional buffer that increases the nominal diameter of the optical fiber to more than twice the nominal diameter of the bare optical fiber, with 900 µm being the most typical nominal diameter. Buffered optical fibers may also be referred to as "buffered cables." Finally, the term "unbuffered optical fibers" refers to optical fibers without a buffer, and therefore may encompass either bare optical fibers or coated optical fibers.

Optical fiber fusion splicing, which is the process by which a permanent, low-loss, high-strength, fused (or welded) joint is formed between two optical fibers, typically involves multiple tasks. First, polymer coatings (e.g., coating layers 16, 18 of FIG. 1) of coated optical fibers (e.g., coated optical fiber 10 of FIG. 1) are stripped to expose glass cladding (e.g., glass cladding 14 of FIG. 1). Next, flat fiber end faces are formed, typically by cleaving exposed glass portions of the fibers. Then the fibers are laterally aligned to each other. The fiber tips must be heated to their softening point and pressed together to form a joint. The completed fusion splice must also be protected from the environment using packaging, which serves to shield fiber surfaces from mechanical degradation (e.g., abrasion) and chemical degradation (e.g., humidity) to ensure that splices exhibit long-term reliability. Optical fibers must typically be able to withstand service temperatures spanning at least a range of from −40° C. to 85° C. without suffering significant mechanical and/or optical performance degradation.

Heat shrink protection sleeves are commonly used as packaging to protect one or more spliced optical fibers. Such a sleeve typically includes an outer heat shrink tube (typically made of a heat shrinkable material (e.g., a polyolefin) and/or a non-stick material (e.g., polytetrafluoroethylene (PTFE)), an inner thermoplastic tube typically made of a melt flow adhesive material (e.g., ethylene vinyl acetate (EVA)), optionally in combination with a rigid (e.g., stainless steel) rod serving as a splint. When heated in an oven (e.g., associated with a fusion splicing tool), the thermoplastic tube melts and is compressed around the fiber and the rigid rod by the heat shrink tube, forming a hermetic seal around the fusion splice region.

An exemplary heat shrink protection sleeve 30 used to protect a splice joint 32 formed between two coated optical fibers 10A, 10B is schematically illustrated in FIGS. 2A and 2B. The heat shrink protection sleeve 30 includes a generally cylindrical inner tube 34 (e.g., a melt flow adhesive material such as ethylene vinyl acetate (EVA)) and a generally cylindrical outer tube 36 (e.g., a polyolefin and/or PTFE), wherein the outer tube 36 generally surrounds the inner tube 34, and the inner tube 34 defines an interior passage 40. Although not shown, the inner tube 34 may optionally include a rigid rod useable as a splint. The outer tube 36 is required for conventional heat shrink protection sleeves because the melt flow adhesive material (e.g., EVA) has a very high viscosity and a very low softening temperature (e.g., about 100° C.). The more temperature-resistant outer tube 36 is typically considered indispensable, particularly when the splice is intended for operation over a high temperature range of up to about 85° C. In use, the heat shrink protection sleeve 30 is positioned over a fusion spliced section of two optical fibers 10A, 10B. The fusion spliced section includes the splice joint 32 arranged between (stripped) glass cladding segments 14A, 14B of the respective optical fibers 10A, 10B. Upon application of heat (typically within an oven), the inner tube 34 melts around the optical fibers 10A, 10B, the glass cladding segments 14A, 14B, and the splice joint 32. The outer tube 36, which includes a cylindrical outer surface 38, may include some heat shrinking capability to help the adhesive distribute around the fused optical fibers 10A, 10B.

Groups of coated optical fibers (e.g., 4, 8, 12, or 24 optical fibers) may be held together using a matrix material, intermittent inter-fiber binders ("spiderwebs"), or tape to form "optical fiber ribbons" or "ribbonized optical fibers" to facilitate packaging within cables. For example, optical fiber ribbons are widely used in cables for high capacity transmission systems. Some modern cables in large-scale data centers or fiber-to-the-home networks may contain up to 3,456 optical fibers, and cables having even higher optical fiber counts are under development. Optical fibers that form a ribbon are arranged in parallel in a linear (i.e., one-dimensional) array, with each fiber having a different color for ease of identification. FIG. 3 provides a cross-sectional view of a multi-fiber ribbon 42, which includes twelve optical fibers 44A-44L and a matrix 46 encapsulating the optical fibers 44A-44L. The optical fibers 44A-44L may be substantially aligned with one another in a generally parallel configuration. Although twelve optical fibers 44A-44L are shown in the multi-fiber ribbon 42, it is to be appreciated that any suitable number of multiple fibers (but preferably at least four fibers) may be employed to form optical fiber ribbons suitable for a particular use.

Mass fusion splicing is a high throughput technology for interconnecting large number of fibers in a ribbon format. First and second segments of up to twelve fibers arranged in a linear array can be fusion spliced simultaneously by mass fusion splicing. Since sequential formation of twelve fusion splices using a traditional single fiber fusion splicing technique is very time consuming, the ability to fusion splice linearly arrayed segments of up to twelve fibers simultaneously enables entire ribbons to be spliced rapidly, thereby improving manufacturing throughput.

Heat shrink protection sleeves similar to those outlined above have also been applied to protect optical fiber ribbon splices, which include multiple fusion splices between first and second arrays of parallel optical fibers contained in first and second optical fiber ribbon segments, respectively. In such a context, an integrated strength member typically includes a flat surface to support the fusion spliced fiber arrays, a thermoplastic inner tube is melted around the spliced ribbon cables and the integrated strength member, and a more temperature-resistant outer tube encases the thermoplastic inner tube. The cross section of a typical ribbon splice protector is 4 mm×4.5 mm, and the length is about 40 mm. Such a splice protector is suitable for interfacing with optical fiber ribbons, but not jacketed cables since the cross-sectional width of a ribbon-type splice protector is much larger than that of a jacketed cable.

Conventional mass fusion splice technology, as well as conventional splice protection technology, only supports one-dimensional arrays of optical fiber splices. For splicing of fibers of small diameter round cables, it is necessary to ribbonize loose tube fibers or arrange rollable optical fiber ribbons in a one-dimensional array to permit mass fusion splicing, and the mass fusion spliced one-dimensional array of fibers is typically protected in a bulky heat shrink sleeve. FIG. 4 illustrates a conventional cable assembly 50 incorporating first and second loose tube-type cables 52A, 52B bearing pre-coated loose optical fibers 54A, 54B, with stripped sections thereof that are mass fusion spliced in a one-dimensional array in a fusion splice region 56 that is protected by a conventional ribbon splice protector 60. The ribbon splice protector 60 includes an outer heat shrink member 64 and an inner thermoplastic member 62 that surrounds the fusion splice region 56 as well as stripped sections (not shown) of the first and second loose optical fibers 54A, 54B. As shown in FIG. 4, the ribbon splice protector 60 has a much larger diameter or width than a diameter or width of each of the first and second loose tube-type cables 52A, 52B.

In a telecommunications system that uses optical fibers, there are typically many locations where fiber optic cables, which carry the optical fibers, connect to equipment or other fiber optic cables. One popular connector for terminating multi-fiber cables is the multi-fiber push-on (MPO) connector. FIGS. 5A and 5B show a multi-fiber push-on (MPO)-type connector 75 installed on a fiber optic cable 76 to form a fiber optic cable assembly 77. The MPO-type connector 75 includes a ferrule 78, a housing 79 received over the ferrule 78, a slider or slide lock 80 received over the housing 79, and a boot 81 received over the fiber optic cable 76. The ferrule 78 is spring-biased within the housing 79 so that a front portion 82 of the ferrule 78 extends beyond a front end 83 of the housing 79. Multiple optical fibers (not shown) carried by the fiber optic cable 76 extend through bores 84 (also known as micro-holes) defined in the ferrule 78 before terminating at or near a front end face 85 of the ferrule 78. The optical fibers are secured within the ferrule 78, such as by using an adhesive material (e.g., epoxy). The optical fibers can be presented for optical coupling with optical fibers of a mating component (e.g., another fiber optic connector; not shown) when the housing 79 is inserted into an adapter, receptacle, or the like.

As shown in FIG. 5B, the MPO-type connector 75 also includes a ferrule boot 86, guide pin assembly 87, spring 88, spring push member 89, and crimp band 90. Optical fibers extend through an aperture defined through the ferrule boot 86. The guide pin assembly 87 includes a pair of guide pins 92 extending from a pin keeper 93. When the MPO-type connector 75 is assembled, the pin keeper 93 is positioned against a back surface of the ferrule 78, and the guide pins 92 extend through pin holes 94 (shown in FIG. 5A) provided in the ferrule 78 so as to project beyond the front end face 85 of the ferrule 78. Both the ferrule 78 and guide pin assembly 87 are biased to a forward position relative to the housing 79 by the spring 88, which is positioned between the pin keeper 93 and a portion of the spring push member 89. The spring push member 89 includes latching arms 95 that engage recesses 96 in the housing 79. A rear portion 91 of the ferrule 78 defines a flange that interacts with a shoulder or stop formed within the housing 79 for retention of the rear portion 91 of the ferrule 78 in the housing 79. In a manner not shown in the figures, tensile members (e.g., Aramid or Kevlar yarn) from the fiber optic cable 76 may be positioned over an end portion (i.e., crimp body portion) 97 of the spring push member 89 that projects rearwardly from the housing 79, and the tensile members are secured to the crimp body portion 97 by deformation of the crimp band 90. The boot 81 covers this region, as shown in FIG. 5A, and provides strain relief for optical fibers emanating from the fiber optic cable 76 by limiting the extent to which the MPO-type connector 75 can bend relative to the fiber optic cable 76.

Splice-on connectors (i.e., connectors incorporating fiber splices) have conventionally been used for field termination of optical fibers. Recently, there has been increasing interest in using splice-on connectors for factory termination of optical fibers. Various multi-fiber splice-on connectors have been developed and have found nice application in field termination of cables, with examples being disclosed in U.S. Pat. Nos. 8,740,479 and 8,678,670. With respect to MPO-type connectors, it has been challenging to simultaneously accommodate the need for protecting splices and permit protected splices to pass through components such as a spring and spring push member. MPO-type connectors are commonly employed with 2.0 mm or 3.0 mm diameter round cables, and utilize a spring push member having a spring push aperture with a diameter of only 3.3 mm A typical design workaround to address the challenge of protecting splices and accommodating passage through small spring push apertures has been to move latch positions of a spring push member to a rear of a connector housing, so that the spring can take up an entire volume inside the connector housing. However, such a design reduces the mechanical robustness of the connector in comparison to conventional spliceless MPO-type connectors. A splice-on MPO connector may also be dimensionally larger than a conventional spliceless MPO connector. Additionally, for round fiber optic cables, the ribbonizing process required for utilization of mass fusion splicing necessitates exposing (by removal of a protective jacket) long lengths of fibers that must be subsequently covered by a long length of heat shrink tubing that negatively affects the aesthetics of the connector and may limit a cable bending radius. Moreover, the cost of splice-on MPO connectors is many times higher than factory connectors, due in significant part to the need for fabrication of custom components in relatively low volumes that differ from the components used in conventional spliceless MPO connectors.

In view of the foregoing, need remains in the art for cable assemblies with intra-connector splices, and improved splice protectors, that address the above-described and other limitations associated with conventional cable assemblies and splice protectors, as well as associated fabrication methods.

SUMMARY

Aspects of the present disclosure provide a multi-fiber splice protector that comprises a strength member including opposing first and second walls connected along only one edge as well as opposing first and second wall extensions that are not connected along edges thereof, with a longitudinal opening permitting passage of multiple spliced optical fibers. A fiber optic cable assembly incorporating the multi-fiber splice protector comprises a plurality of fusion spliced optical fibers with a plurality of splice joints arranged in an internal cavity and/or internal cavity extension of the strength member. Another fiber optic cable assembly comprises a plurality of fusion splices between optical fibers of first and second fiber optic cable sections, a multi-fiber push-on (MPO) connector including a multi-fiber ferrule in which optical fibers of the first fiber optic cable section are terminated, and a plurality of splice joints between the multi-fiber ferrule and a boot of the MPO connector, wherein at least a portion of a split jacket section of the second fiber optic cable section is arranged within the boot. The preceding fiber optic cable assembly comprises one of the following features; (i) the jacket comprises a split length of no greater than 25 mm; (ii) an entirety of the split jacket section is arranged within the boot, which comprises a length of no greater than 33 mm; (iii) the assembly is devoid of heat shrink tubing that both (a) extends from a position within the boot to a position outside the boot, and (b) extends around a circumference of at least a portion of the split jacket section; or (iv) the assembly comprises heat shrink tubing that extends around a circumference of at least a portion of the split jacket section, wherein an aggregate length from a proximal end of the boot to a distal end of the heat shrink tubing is no greater than 33 mm. A method for fabricating a fiber optic cable is also provided. Such a method comprises fusion splicing stripped ends of first and second pluralities of optical fibers to form a plurality of fusion spliced optical fibers. A further steps comprise arranging a multi-fiber splice protector comprising a strength member around the plurality of splice joints; fitting at least a portion of the multi-fiber splice protector through a spring and a spring push member; securing the second cable assembly to the spring push member with a crimp band; and fitting a boot around the crimp band and at least a portion of the spring push member.

In one embodiment of the disclosure, a multi-fiber splice protector is provided. The multi-fiber splice protector comprises a strength member that includes a first second and a second section. The first section comprises a U-shaped cross-sectional shape including a first wall portion, a second wall portion arranged parallel to the first wall portion, and a first edge portion connecting adjacent first edges of the first and second wall portions bounding an internal cavity, wherein adjacent second edges of the first and second wall portions opposing the first edges are unconnected. The second section comprises a first wall portion extension that extends in a longitudinal direction relative to the first wall portion and a second wall portion extension that extends in a longitudinal direction relative to the first second portion and is arranged parallel to the first wall portion extension to bound an internal cavity extension, wherein adjacent first edges of the first wall portion extension and the second wall portion extension are unconnected, and wherein adjacent second edges of the first wall portion extension and the second wall portion extension that oppose the first edges are unconnected. The strength member is bend-resistant, and the second edges of the first wall portion, the second wall portion, the first wall portion extension, and the second wall portion extension bound a longitudinal opening permitting the passage of a plurality of spliced optical fibers into the internal cavity and the internal cavity extension.

The foregoing multi-splice protector may be incorporated into a fiber optic cable assembly that additionally comprises a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section. The fiber optic cable assembly further comprises a plurality of fusion splices including a plurality of splice joints joining ends of the stripped sections of the first plurality of optical fibers with ends of the stripped sections of the second plurality of optical fibers to form a plurality of fusion spliced optical fibers. The plurality of splice joints are arranged in at least one of the internal cavity or the internal cavity extension of the strength member.

In accordance with another embodiment of the disclosure, a fiber optic cable assembly is provided. The fiber optic cable assembly comprises a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section, wherein the second fiber optic cable section comprises a jacket, and wherein a portion of the jacket is split to form a split jacket section. The fiber optic cable assembly additionally comprises a plurality of fusion splices including a plurality of splice joints joining ends of the stripped sections of the first plurality of optical fibers with ends of the stripped sections of the second plurality of optical fibers to form a plurality of fusion spliced optical fibers. The fiber optic cable assembly further comprises a multi-fiber push-on (MPO) connector that comprises a multi-fiber ferrule, a spring, a spring push member, a crimp band, and a boot, wherein optical fibers of the first plurality of optical fibers are terminated in the multi-fiber ferrule, wherein the plurality of splice joints are arranged between the multi-fiber ferrule and a distal end of the boot; and wherein at least a portion of the split jacket section is arranged within the boot. The fiber optic cable assembly additionally comprises one of the following features (i) to (iv): (i) the jacket comprises a split length of no greater than 25 mm; (ii) an entirety of the split jacket section is arranged within the boot, and the boot comprises a length of no greater than 33 mm; (iii) the fiber optic cable assembly is devoid of heat shrink tubing that both (a) extends from a position within the boot to a position outside the boot, and (b) extends around a circumference of at least a portion of the split jacket section; or (iv) the fiber optic cable assembly comprises heat shrink tubing that extends around a circumference of at least a portion of the split jacket section, wherein an aggregate length from a proximal end of the boot to a distal end of the heat shrink tubing is no greater than 33 mm.

Additional features and advantages will be set forth in the detailed description that follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 8A is a perspective view of a splice protector including the strength member of FIGS. 7A-7B covering a fusion splice region of multiple fusion spliced optical fibers and including a thermoplastic hotmelt material encasing previously stripped portions of the optical fibers.

FIG. 8B is a cross-sectional view of a portion of the strength member, fusion spliced optical fibers, and thermoplastic hotmelt material shown in FIG. 8A.

FIG. 9A is a top plan view of a multi-fiber ferrule stub including a multi-fiber ferrule in which a first plurality of optical fibers are terminated, with lengths of optical fibers including stripped end portions extending from a distal end of the multi-fiber ferrule.

FIG. 9B is a perspective view of the strength member of FIGS. 7A-7B arranged proximate to the multi-fiber stub of FIG. 9A and a second plurality of optical fibers following fusion splicing between stripped end portions of the first and second pluralities of optical fibers.

FIG. 9C is an upper perspective view of a subassembly comprising the multi-fiber ferrule, fusion spliced optical fibers, and strength member of FIG. 9B, with the strength member arranged to protect fusion splices and previously stripped sections of the fusion spliced optical fibers.

FIG. 9D is a lower perspective view of the subassembly of FIG. 9C.

FIG. 10D is a side elevational assembly view of a fiber optic cable assembly according to FIG. 10A, including optional heat shrink tubing.

FIG. 10E is a top plan view of the fiber optic cable assembly according to FIGS. 10A and 10E following assembly thereof.

FIG. 11A is a perspective assembly view of a portion of a fiber optic cable assembly according to one embodiment, including spliced optical fibers terminated in a ferrule, with a spring and a spring push member surrounding portions of a strength member as disclosed herein to protect splice regions, and with a fiber ribbon extending past the strength member.

FIG. 11B is a rear elevational view of the fiber optic cable assembly portion of FIG. 11A.

FIG. 11C is a top plan view of the fiber optic cable assembly portion of FIG. 11A, following insertion of a connector housing over the multi-fiber ferrule to engage the spring push member to form a MPO-type connector.

FIG. 12 is a top plan view of a fiber optic cable assembly portion incorporating the elements shown in FIG. 11C, with addition of a boot covering a portion of the spring push member and a jacket covering the fiber ribbon to form a rectangular ribbon cable extending from the boot.

DETAILED DESCRIPTION

Figure 1:
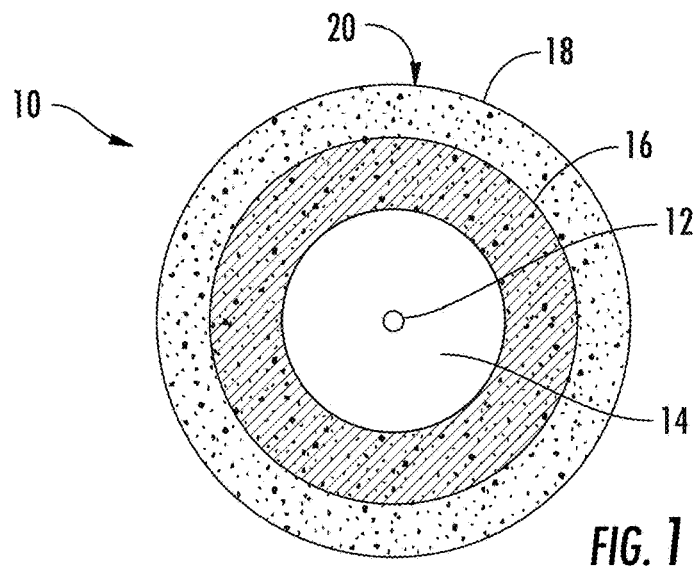
FIG. 1 is a cross-sectional view of a conventional coated optical fiber that may be subject to fusion splicing, prior to stripping of a multi-layer polymer coating from glass cladding.
Figure 2A:
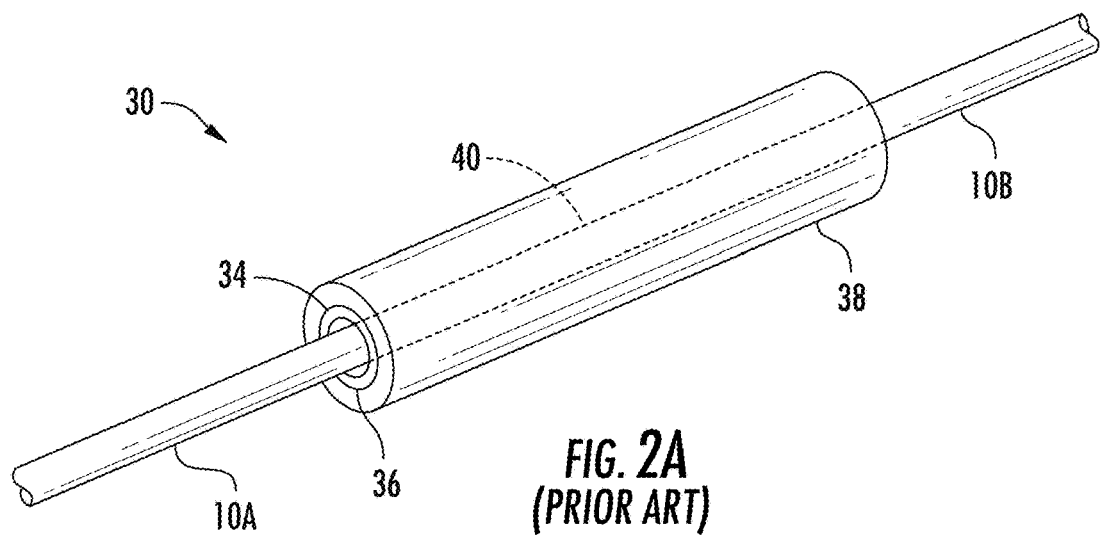
FIG. 2A is a schematic perspective view of a conventional heat shrink protection sleeve used to protect a splice joint between two optical fibers.
Figure 2B:
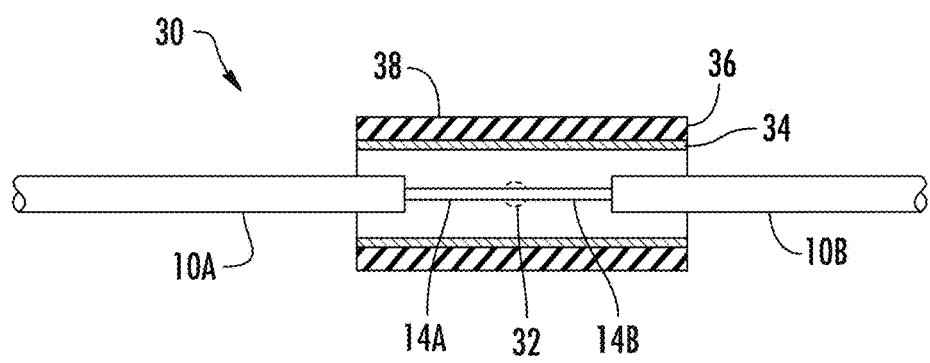
FIG. 2B is a schematic cross-sectional view of the heat shrink protection sleeve and optical fibers of FIG. 2A, with schematic illustration of the splice joint between stripped portions of the two optical fibers.
Figure 3:
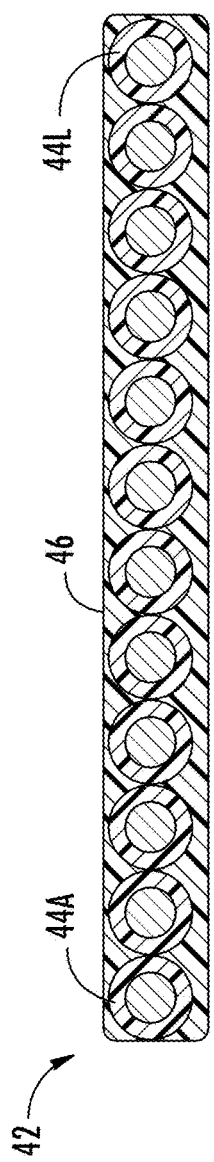
FIG. 3 is a cross-sectional view of a conventional optical fiber ribbon including twelve optical fibers.
Figure 4:
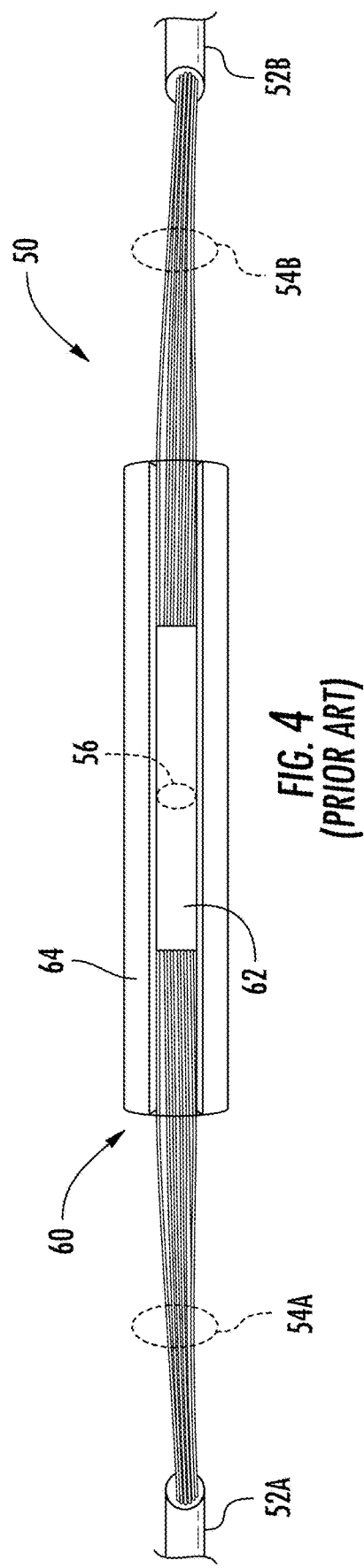
FIG. 4 is a cross-sectional view of a conventional cable assembly incorporating a ribbon splice protector used to protect splice joints between two groups of optical fibers.
Figure 5A:
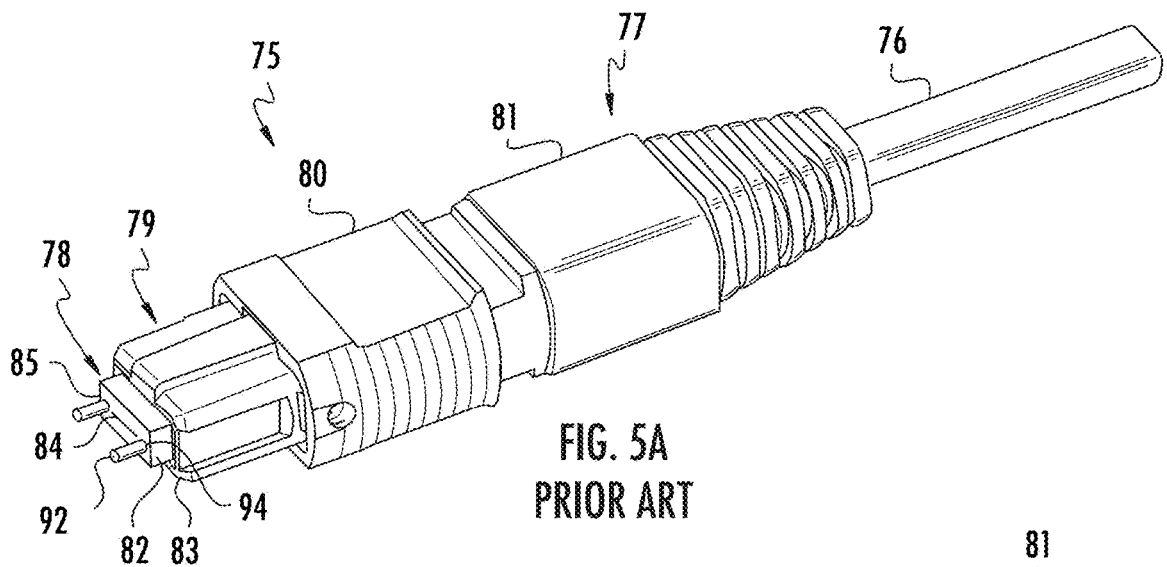
FIG. 5A is a perspective view of a conventional multi-fiber push-on (MPO) type connector.
Figure 5B:
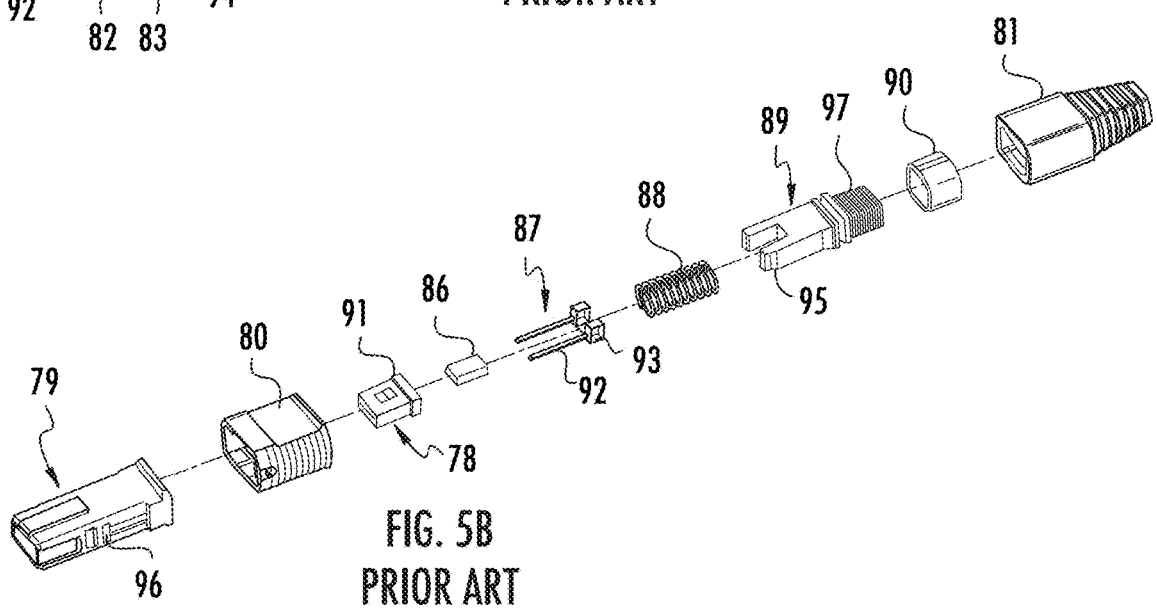
FIG. 5B is an exploded perspective view of the MPO-type connector of FIG. 5A.

Various embodiments will be further clarified by examples in the description below. In general, the description relates to a multi-fiber splice protector that comprises a strength member including opposing first and second walls connected along only one edge as well as opposing first and second wall extensions that are not connected along edges thereof. A longitudinal opening permits passage of multiple spliced optical fibers, and the splice protector has a compact width that permits it to be incorporated in a multi-fiber push-on (MPO) type connector that utilizes conventional MPO connector components. The foregoing multi-fiber splice protector may be incorporated in a fiber optic cable assembly to protect splice joints of a plurality of fusion spliced optical fibers, with the splice joints arranged in an internal cavity and/or internal cavity extension of the strength member. Another fiber optic cable assembly comprises a plurality of fusion splices between optical fibers of first and second fiber optic cable sections, a multi-fiber push-on (MPO) connector including a multi-fiber ferrule in which optical fibers of the first fiber optic cable section are terminated, and a plurality of splice joints between the multi-fiber ferrule and a boot of the MPO connector, wherein at least a portion of a split jacket section of the second fiber optic cable section is arranged within the boot. According to such an assembly, a cable jacket may have a short split length (e.g., no greater than 25 mm), and/or an entirety of a split jacket section may be arranged within a boot having a length of no greater than 33 mm. A short jacket split length in combination with a compact splice protector may dispense with the need for heat shrink tubing that extends around a split jacket section and further extends beyond a terminus of a boot (e.g., from a position within the boot to a position outside the boot). Even if heat shrink tubing is present, a short jacket split length in combination with a compact splice protector may dispense with the need for heat shrink tubing that extends around a split jacket section with an aggregate length of no greater than 33 mm from a proximal end of a boot to a distal end of the heat shrink tubing. A method for fabricating a fiber optic cable that incorporates multiple fusion splice optical fibers and a splice protector within a multi-fiber splice protector is also provided, including fitting at least a portion of the multi-fiber splice protector through a spring and a spring push member; securing the second cable assembly to the spring push member with a crimp band; and fitting a boot around the crimp band and at least a portion of the spring push member.

In this disclosure, the language "fusion spliced optical fiber" refers to two optical fibers that have been fusion spliced together to form a permanent, optical link incorporating the two optical fibers. The singular noun "fusion spliced optical fiber" is used even though two optical fibers are initially present because, after fusion splicing, the resulting optical link is intended to function like a continuous optical fiber (even though there may be some attenuation resulting from the fusion splice joint). Using the singular form also facilitates discussions involving groups of these fusion spliced optical fibers, as will be apparent. A fusion spliced optical fiber may desirably include a polymeric overcoating over the fusion splice joint as well as over stripped portions of optical fibers proximate to the fusion splice joint.

Likewise, in this disclosure, the two optical fibers that define a given "fusion spliced optical fiber" may alternatively be referred to as "optical fiber segments." Using the language "optical fiber segments" rather than "optical fibers" helps clarify when the disclosure is referring to one of the pairs of optical fibers that form one of the fusion spliced optical fibers, versus one of the fusion spliced optical fibers itself.

In certain embodiments, after fusion splicing, portions of the fusion spliced optical fibers proximate to a splice region may be coated (e.g., ribbonized) with thermoplastic hotmelt material (e.g., to any desired overall thickness, such as 0.1 mm to 0.35 mm). Prior to insertion of fusion spliced optical fibers into a splice protector, portions of the thermoplastic hotmelt material forming the ribbon matrix material may be at least partially delaminated (e.g., by heating or peeling), leaving a short length (e.g., less than 3 mm, or less than 2 mm) of ribbon matrix holding individual fusion spliced optical fibers together proximate to a splice region.

In certain embodiments, the following steps may be performed prior to sequential insertion of fusion spliced optical fibers through the longitudinal opening of a strength member into an internal cavity thereof: ribbonizing a first plurality of optical fibers emanating from a first fiber optic cable section using the thermoplastic hotmelt material to form a first ribbon matrix, wherein each optical fiber of the first plurality of optical fibers includes a pre-coated section and a stripped section; ribbonizing a second plurality of optical fibers emanating from a second fiber optic cable section using the thermoplastic hotmelt material to form a second ribbon matrix, wherein each optical fiber of the second plurality of optical fibers includes a pre-coated section and a stripped section; mass fusion splicing ends of the stripped sections of the first plurality of optical fibers with ends of the stripped sections of the second plurality of optical fibers to form the plurality of fusion spliced optical fibers; delaminating a portion of the first ribbon matrix proximate to transitions between the pre-coated sections and the stripped sections of the first plurality of optical fibers; and delaminating a portion of the second ribbon matrix proximate to transitions between the pre-coated sections and the stripped sections of the second plurality of optical fibers.

In certain embodiments, a strength member of a splice protector has a length at least as long as the total length of stripped sections of optical fiber segments to be spliced. For mass fusion spliced optical fibers, the total length of a splice protector may be as short as about 20 mm. For individually spliced fibers, the total length of a splice protector may be as short as about 10 mm. While a short splice protector is desired to minimize the rigid length in a spliced cable, a longer splice protector improves the tensile strength of the protected splices. In certain embodiments, a splice protector may have a tensile strength of at least 20 lbf, or in a range of 20 lbf to 40 lbf. Length, thickness, and material composition of a strength member can be optimized to confer a desired degree of bend resistance to a multi-fiber splice protector. One method for evaluating bend resistance of a multi-fiber splice protector as described herein is with a three point bending model, assuming that ends of the splice protector are supported (e.g., from below) and a force is applied to the middle of the multi-fiber splice protector in a direction (e.g., downward direction) opposing the support. In certain embodiments, a bend resistant multi-fiber splice protector can withstand such a force of at least one of the following values, with the splice protector arranged in any radial orientation and without deformation: at least 5 lbf, at least 10 lbf, at least 20 lbf, at least 50 lbf, within a range of 5 lbf to 50 lbf, or within a range of 5 lbf to 10 lbf.

In certain embodiments, a fiber optic cable assembly includes a plurality of fusion spliced optical fibers, with each spliced optical fiber including two optical fiber segments that are arranged serially and joined together by a splice (e.g., a fusion splice) to define a fusion splice joint. The fusion splice joints of the plurality of fusion spliced optical fibers define a fusion splice region of the fiber optic cable assembly. The fiber optic cable assembly may include a polymeric overcoating, in which polymeric material beneficially overcoats or encapsulates the fusion splice region and stripped sections of the optical fibers. The polymeric material may include or consist of a thermoplastic hotmelt material. In certain embodiments, the maximum width and height dimensions of the polymeric material are only slightly larger than maximum width and height dimensions of an array of pre-coated sections of the optical fibers proximate to the stripped sections.

Figure 6:
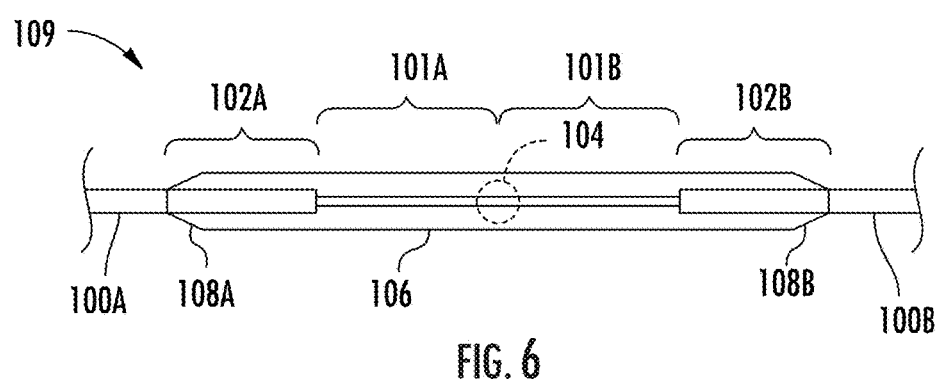
FIG. 6 is a schematic side view illustration of a fusion spliced section of optical fibers including a solid overcoating of thermoplastic material arranged over stripped sections of the first and second optical fibers, a splice joint, and pre-coated sections of the first and second optical fibers.

FIG. 6 is a schematic side view of an overcoated fusion spliced section 109 of optical fibers 100A, 100B, wherein a solid overcoating 106 of thermoplastic material has a substantially constant outer diameter over the majority of its length. Each optical fiber 100A, 100B includes a coating, with portions of each optical fiber 100A, 100B being previously stripped of such coating to form stripped sections 101A, 101B embodying glass cladding. Ends of the stripped sections 101A, 101B are fusion spliced to form a splice joint 104. As shown, the solid overcoating 106 of thermoplastic material extends over the splice joint 104, the previously stripped sections 101A, 101B, and short (previously unstripped) lengths 102A, 102B of the optical fibers 100A, 100B. The solid overcoating 106 may optionally include tapered thickness ends 108A, 108B as depicted in FIG. 6, and a central section having a substantially constant outer diameter that exceeds an outer diameter of unstripped portions of the optical fibers 100A, 100B. As mentioned above, the coated optical fibers 50A, 50B may each have a nominal outer diameter of 0.25 mm (250 µm) in some embodiments. In certain embodiments, the solid overcoating 106 may have a diameter or thickness that is substantially equal to a diameter or thickness of the unstripped portions of the optical fibers 100A, 100B.

Although only a single overcoated fusion spliced optical fiber section 109 is shown in FIG. 6, it is to be appreciated that a solid overcoating similar to the solid overcoating 106 shown in FIG. 6 may be applied to multiple fusion spliced optical fibers arranged in a one-dimensional array. In such a situation, the above-described outer diameter values for solid overcoating of thermoplastic hotmelt material may correspond to thickness values for the solid overcoating applied to an array of fusion spliced optical fibers.

A thermoplastic hotmelt material useable to overcoat fusion spliced optical fibers comprises a thermoplastic material that may be heated to a flowable state. In certain embodiments, fusion spliced optical fibers may be temporarily placed in a cavity (e.g., a mold cavity), a housing, a trough, or a container in which thermoplastic hotmelt material in a flowable state is present, or to which such thermoplastic hotmelt material in a flowable state is supplied. In certain embodiments, fusion spliced optical fibers may be dipped into (or otherwise contacted with) a pool of molten thermoplastic material to effectuate coating. In certain embodiments, a polymeric material that may be used to overcoat portions of fusion spliced optical fibers may include a melt-flow thermoplastic adhesive material. Examples of thermoplastic hotmelt materials that may be used in certain embodiments include, but are not limited to ethylene vinyl acetate (EVA), polyurethanes, and polyamides.

To avoid thermal degradation of one or more acrylate coating layers of the pre-coated sections of the fusion spliced optical fibers, molten thermoplastic material to be used for overcoating should be maintained at a processing temperature below a melt temperature of the one or more acrylate coating layers. To promote formation of a suitable overcoating, the molten thermoplastic material may also be maintained at a processing temperature at which the molten thermoplastic material has a melt viscosity in a range of from about 100 centipoises (cps) to about 10,000 cps, or more preferably in a subrange of from about 1,000 cps to about 10,000 cps, or more preferably in a subrange of from about 2,000 cps to about 4,000 cps.

In certain embodiments, desirable thermoplastic hotmelt and/or overcoating materials differ from conventional melt-flow adhesive glue sticks or typical thermoplastic materials in that they desirably: have a medium viscosity (e.g., according to one or more of the ranges outlined above) at a processing temperature; are chemically stable at the processing temperature, have a glass transition temperature of no greater than −40° C.; have a service temperature spanning at least a range of from −40° C. to 85° C. without suffering significant mechanical and/or optical performance degradation; exhibit strong adhesion to fiber coating layers and bare glass; are free from charring; and/or exhibit minimal to no outgassing (e.g., of volatile organic compounds and/or other constituents). A glass transition temperature is the point at which a material goes from a hard brittle state to a flexible or soft rubbery state as temperature is increased. A common method for determining glass transition temperature uses the energy release on heating in differential scanning calorimetry. If a plastic (e.g., thermoplastic) material associated with an optical fiber is exposed to a temperature below its glass transition temperature, then the material will become very hard, and the optical fiber may be susceptible to micro bend losses. In certain embodiments, service temperature of a thermoplastic overcoating material may be determined by compliance with one or more industry standards for telecommunication fiber reliability testing, such as (but not limited to): ITU-T G.652, IED60793-2, Telcordia GR-20-CORE and TIA/EIA-492.

In certain embodiments, a thermoplastic hotmelt material and/or a thermoplastic overcoating useable with embodiments disclosed herein has a heat resistance temperature of at least 100° C., a melting temperature of less than 240° C., and a melt viscosity of less than 10,000 cps. In certain embodiments, a thermoplastic hotmelt material may comprise a melt-flow thermoplastic adhesive material, such as TECHNOMELT® PA 6208 polyamide material (Henkel Corp., Dusseldorf, Germany). Such material exhibits a heat resistance temperature greater than 90° C., a melt-flow temperature lower than 260° C., a melt viscosity between 100 cps and 10,000 cps, and a hardness of at least Shore A 45. In certain embodiments, a thermoplastic hotmelt material useable with multi-fiber splice protectors disclosed herein may include PA682 hotmelt adhesive commercially available from Henkel Corp. Further details regarding thermoplastic overcoating of fusion spliced optical fibers and/or portions of fiber optic cable assemblies are disclosed in U.S. Patent Application Publication No. 2020/0012047A1 published on Jan. 9, 2020, wherein the content of the foregoing publication is hereby incorporated by reference herein.

Formation of a solid thermoplastic overcoating over at least a short distance of pre-coated sections of optical fibers bounding a spliced segment (e.g., at either end of stripped sections joined at a splice joint) beneficially ensures that all previously stripped (glass) sections are fully overcoated. In certain embodiments, a solid thermoplastic overcoating extends over a length of a pre-coated section of each of the first and second optical fibers, wherein the overcoated length of each pre-coated section is in a range of from about 1 mm to about 10 mm. Additionally, since the solid thermoplastic overcoating may adhere to one or more coating layers of an optical fiber more readily than to (pre-stripped) exposed glass sections, providing a solid thermoplastic overcoating of sufficient length to overlap at least a short distance of pre-coated sections of optical fibers bounding a spliced segment promotes more secure adhesion between the solid thermoplastic overcoating and the fusion spliced segment as a whole. In certain embodiments, a solid thermoplastic overcoating and a fusion spliced segment utilize a thermoplastic material that is devoid of additives configured to promote adhesion to glass, such as silane.

In preferred embodiments, a solid thermoplastic overcoating is water-resistant and serves to block moisture from reaching the splice joint and the previously stripped glass region of a fusion spliced segment of optical fibers. This is beneficial since moisture is known to chemically interact with glass cladding of optical fibers and cause expansion of micro defects in the glass, thereby leading to long-term failure of optical fibers. The solid thermoplastic overcoating is preferably also devoid of sharp particles (e.g., inorganic filler particles) and air bubbles. The solid thermoplastic overcoating may also be devoid of a UV curable material. In certain embodiments, formation of air bubbles may be reduced by contacting stripped sections and pre-coated sections of fusion spliced first and second optical fibers with molten thermoplastic material in a subatmospheric pressure environment (e.g., in a range of from 0.01 to 0.9, or 0.1 to 0.8, or 0.1 to 0.7 times local atmospheric pressure), such as may be attained in a partially evacuated chamber or other enclosure.

In certain embodiments, portions of fusion spliced optical fibers may be overcoated with thermoplastic hotmelt material prior to insertion of the optical fibers into a strength member (i.e., through a longitudinal opening of the strength member into an internal cavity thereof). This initial overcoating may effectively ribbonize (or re-ribbonize) previously stripped portions of multiple fusion spliced optical fibers, thereby aiding in handling the optical fibers prior to and during insertion into a strength member. The initial overcoating may also prevent the potential formation of voids within the internal cavity of a strength member, depending on factors such as the amount and condition of thermoplastic hotmelt material present within the internal cavity and/or the manipulation of fusion spliced optical fibers during insertion into the internal cavity.

In certain embodiments, the thermoplastic hotmelt material with which the fusion spliced optical fibers are overcoated is compositionally the same as (or substantially similar to) thermoplastic hotmelt material initially present within the internal cavity of the strength member (i.e., prior to insertion of optical fibers through the longitudinal opening). Compositional matching between the overcoating material and the thermoplastic hotmelt material initially present within the internal cavity permits the respective materials (upon heating) to assimilate without a dissimilar material boundary after fusion spliced optical fibers are inserted through a longitudinal opening into the internal cavity of a strength member to form a cable assembly including a multi-fiber splice protector.

In certain embodiments, pre-coated (i.e., acrylate coated) optical fibers subject to being fusion bonded and overcoated (or encapsulated) according to methods disclosed herein are prepared for fusion bonding (e.g., by stripping ends thereof) utilizing non-contact fiber stripping methods and/or apparatuses, such as those disclosed in U.S. Pat. No. 9,167,626 B2 ("the '626 Patent"), which is hereby incorporated by reference. Briefly, the '626 Patent discloses use of a heater configured for heating a heating region to a temperature above a thermal decomposition temperature of at least one coating of an optical fiber, a securing mechanism for securely positioning a lengthwise section of the optical fiber in the heating region, and a controller operatively associated with the heater and configured to deactivate the heater no later than immediately after removal of the at least one coating from the optical fiber. Thermal decomposition of at least one coating of an optical fiber reduces or minimizes formation of flaws in optical fibers that may be generated by mechanical stripping methods and that can reduce their tensile strength.

In certain embodiments, unjacketed optical fiber segments emanating from the same jacket may be initially loose, but subsequently ribbonized to provide consistent spacing between fibers to facilitate utilization of a mass fusion splicing process for forming multiple splice joints between multiple pairs of optical fibers in a substantially simultaneous manner. To fabricate an optical fiber ribbon, optical fibers of an unjacketed segment may be contacted with at least one polymeric material (e.g., thermoplastic hotmelt material) in a flowable state, and the at least one polymeric material may be solidified. When optical fiber ribbons are used, mass fusion splicing may be performed between ends of optical fibers of a first optical fiber ribbon and ends of optical fibers of a second optical fiber ribbon.

Optical fibers of a first plurality of optical fiber segments and of a second plurality of optical fiber segments to be fusion bonded may be arranged in first and second conventional fiber sorting fixtures, respectively, during stripping and/or fusion bonding steps. A typical fiber sorting fixture includes a slot having an opening dimension (e.g., height) that closely matches a corresponding dimension of unbuffered, coated optical fibers to maintain portions of the optical fibers proximate to ends to be stripped (and subsequently fusion spliced) in fixed, substantially parallel positions embodying a one-dimensional array. In certain embodiments, coated optical fibers having outer diameters of either 200 μm or 250 μm may laterally abut one another in a fiber sorting fixture, such that cores of adjacent optical fibers are also spaced either 200 μm or 250 μm apart. After stripping of acrylate coating material from end sections (to form stripped sections) of the optical fibers, the remaining (bare glass) cladding and core portions are in a non-contacting (and non-crossing) relationship, and bare glass ends of the optical fibers may be fusion bonded using conventional fusion bonding method steps known to those skilled in the art. Mass fusion bonding may be used in any embodiments disclosed herein. Variations of the techniques disclosed in the '626 Patent are disclosed in U.S. Pat. Nos. 10,018,782 and 9,604,261, the disclosures of which are also hereby incorporated by reference herein. Non-contact stripping methods using lasers or hot gases are also possible in certain embodiments.

Figure 7A:
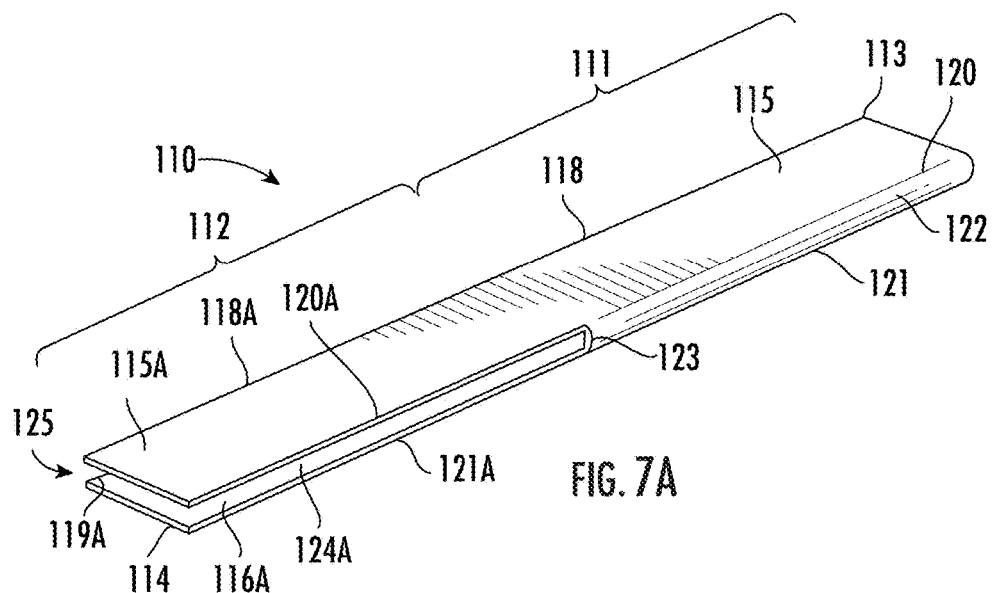
FIG. 7A is a perspective view of a strength member of a multi-fiber splice protector according to one embodiment of the present disclosure.
Figure 7B:
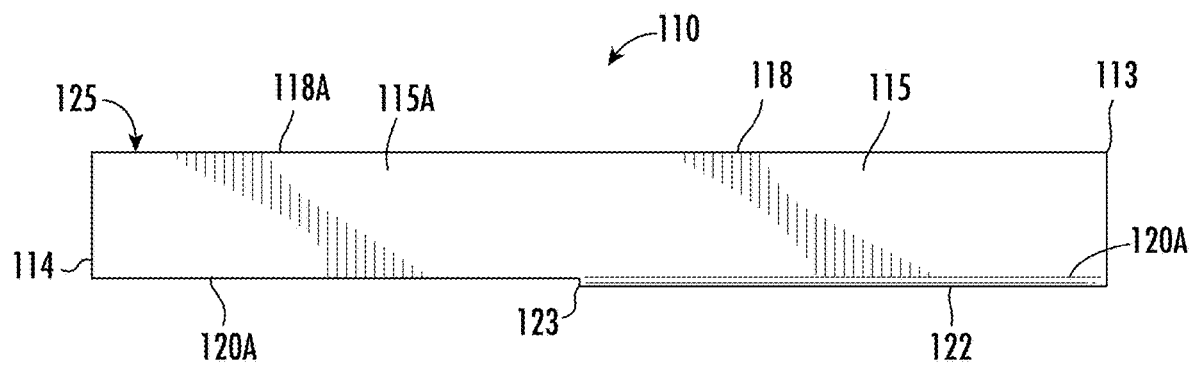
FIG. 7B is a top elevational view of the strength member of FIG. 7A.
Figure 7C:
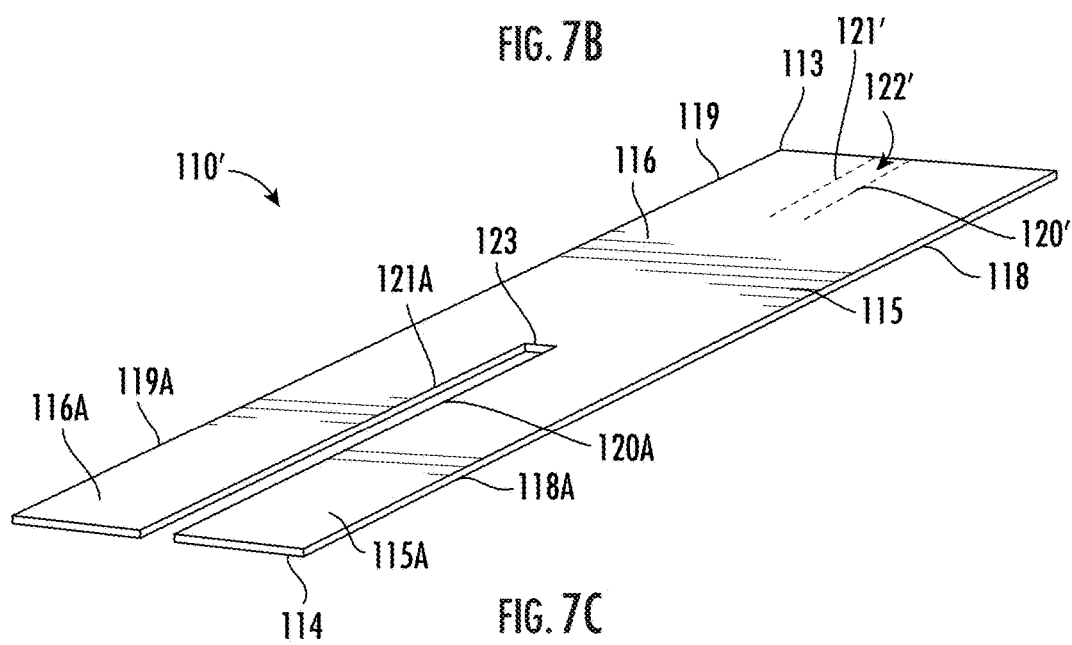
FIG. 7C is a perspective view of a flat metal blank that may be used to fabricate the strength member of FIGS. 7A and 7B.

A strength member 110 of a multi-fiber splice protector according to one embodiment is shown in FIGS. 7A-7B, and a flat blank 110' used to produce the strength member 110 is shown in FIG. 7C. Referring to FIGS. 7A-7B, the strength member 110 includes a first section 111 and a second section 112 that in combination form a unitary body structure, with the respective first and second sections 111, 112 bounded by first and second ends 113, 114 of the strength member 110. In certain embodiments, the strength member 110 may comprise a length of 15 mm to 35 mm, or about 25 mm. In certain embodiments, the first section 111 has a length of no greater than 75%, no greater than 50%, or no greater than 25% of an overall length of the strength member 110. In certain embodiments, the second section 112 may comprise a length in a range of 5 mm to 15 mm, or about 10 mm to 13 mm. The first section 111 includes opposing first and second wall portions 115, 116 (wherein second wall portion 116 is shown in FIG. 7C) configured as flat plate-like members. The first wall portion 115 is laterally bounded by a first edge 120 and a second edge 118. The second wall portion 116 is laterally bounded by a first edge (121 as shown in FIG. 8B, and corresponding to bend line 121' shown in FIG. 7C) and a second edge 119 (shown in FIG. 7C). The adjacent first edges 120, 121 of the first and second wall portions 115, 116 are joined by a first edge portion 122, while the adjacent second edges 118, 119 of the first and second wall portions 115, 116 are unconnected. The first edge portion 122 extends from the first end 113 to an edge boundary 123. The second section 112 includes opposing first and second wall portion extensions 115A, 116A that extend from the first and second wall portions 115, 116, respectively. The first wall portion extension 115A is laterally bounded by a first edge 120A and a second edge 118A, while the second wall portion extension 116A is laterally bounded by a first edge 121A and a second edge 119A. The first edges 120A, 121A and the second edges 118A, 119A of the first and second wall portion extensions 115A, 116A are unconnected, such that the first and second wall portion extensions 115A, 116A are cantilevered from the corresponding first and second wall portions 115, 116. An internal cavity is provided between the first and second wall portions 115, 116, and an internal cavity extension 124A is provided between the first and second wall portion extensions 115A, 116A. A longitudinal opening 125 extends continuously between the first edges 120, 120A and the second edges 118, 118A of the first and second wall portions 115, 116 and the first and second wall portion extensions 115A, 116A, and extends from the first end 113 to the second end 114. The longitudinal opening 125 permits the passage of a plurality of fusion spliced optical fibers (e.g., as shown in FIG. 8A) into the internal cavity and the internal cavity extension 124A of the strength member 110. In certain embodiments, the first and second sections 111, 112 may comprise a unitary metal body. In certain embodiments, the second section 112 may comprises a width of no greater than 3.2 mm, or in a range of 1.6 mm to 3.2 mm.

As noted previously, FIG. 7C is a perspective view of a flat metal blank 110' that may be used to fabricate the strength member 110 of FIGS. 7A-7B. The blank 110' may be fabricated by any suitable method such as stamping, mechanical machining, electron discharge machining, waterjet cutting, additive manufacturing (e.g., three dimensional printing) or the like. Following formation of the blank 110', the blank 110' may be subjected to bending steps along the illustrated bend lines 121' and 120' to cause the first wall portion 115 and the first wall portion extension 115A to be arranged parallel to the second wall portion 116 and the second wall portion extension 116A, with a connecting region 122' being used to form the first edge portion 122. In certain embodiments, the first edge portion 122 may be rounded to provide a U-shaped cross-sectional profile; and in certain embodiments, at least part of the first edge portion 122 may be arranged substantially perpendicular to the first and second wall portions 115, 116. The remaining portions of the blank 110' were described previously in connection with FIGS. 7A-7B. In certain embodiments, the blank 110' may comprise metal (e.g., stainless steel or aluminum) having a thickness in a range of 0.1 mm to 0.3 mm, or in a range of 0.1 mm to 0.3 mm, or in a range of 0.125 mm to 0.175 mm, or a value of about 0.15 mm.

In certain embodiments, a strength member may be fabricated of alternative materials such as glasses and/or ceramics to form a unitary glass or ceramic body, by methods such as sintering and/or firing followed by milling and/or cutting.

Figure 7D:
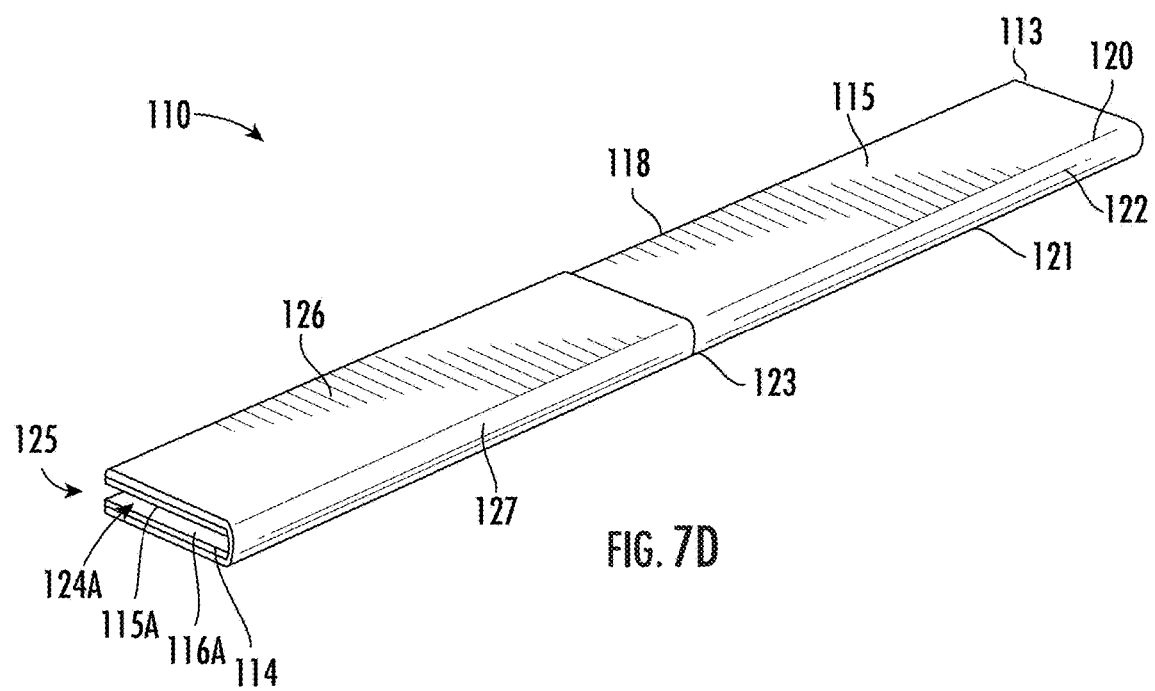
FIG. 7D is a perspective view of the strength member of FIGS. 7A-7B with addition of polymeric tape covering the first and second wall portion extensions and one edge thereof.

FIG. 7D is a perspective view of the strength member 110 of FIGS. 7A-7B with addition of polymeric tape 126 covering the first and second wall portion extensions 115A, 116A (shown in FIG. 7A) and covering a side of the internal cavity extension 124A to form a lateral boundary 127. The polymeric tape 126 may comprise a polymeric layer and an adhesive layer. In certain embodiments, a polymeric layer devoid of an adhesive layer may be used. The polymeric tape 126 may comprise any suitably thin, preferably non-stick material such as polytetrafluoroethylene (or other fluorinated polymer material) tape, and may have an adhesive arranged on one surface thereof to contact the first and second wall portion extensions 115A, 116A. In certain embodiments, an outer surface of a polymeric material not adhered to a strength member has a surface energy 15.0 to 30 mJ/m² to provide non-stick functionality. One function of the polymeric tape 126 is that it may help retain thermoplastic material within the internal cavity extension 124A (e.g., during insertion of spliced optical fibers (not shown) through the longitudinal opening 125 into the internal cavity and the internal cavity extension 124A). Regardless of whether thermoplastic hotmelt material is present within the strength member 110, in certain embodiments, outer surfaces of the strength member 110 may be clean and free of residual thermoplastic hotmelt or other adhesive material. The remaining portions of the strength member 110 were described previously in connection with FIGS. 7A-7B.

Figure 7E:
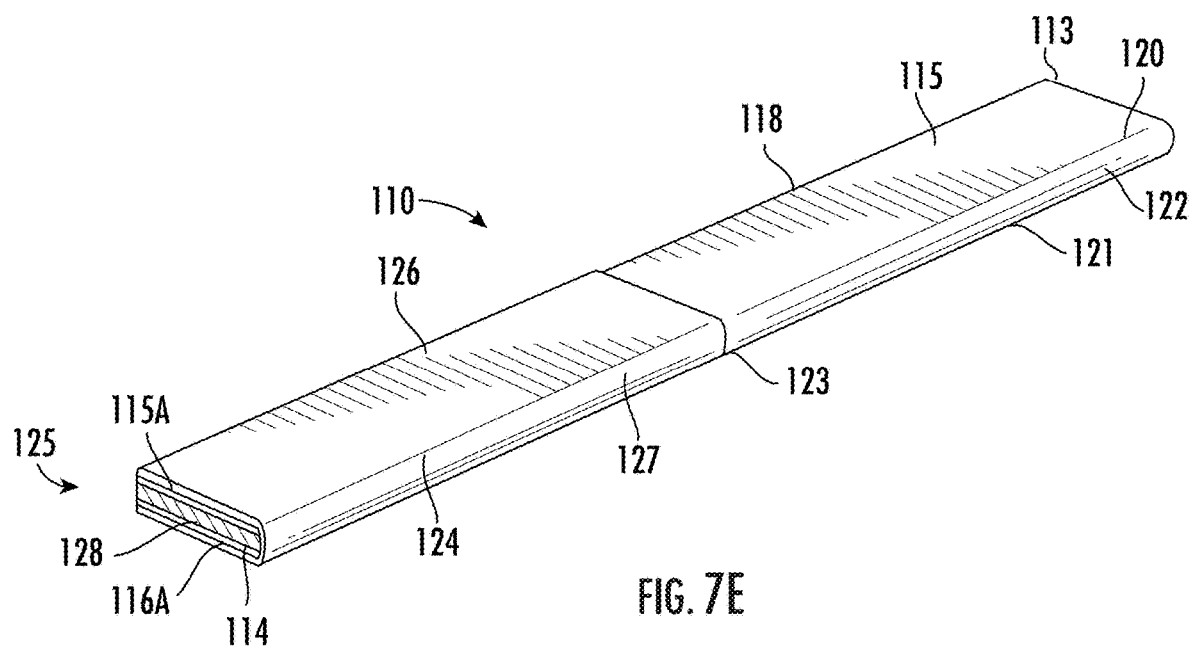
FIG. 7E is a perspective view of the strength member and polymeric tape of FIG. 7D, with addition of thermoplastic hotmelt material to the internal cavity and internal cavity extension of the strength member.

In certain embodiments, an internal cavity and internal cavity extension of a strength member may be pre-loaded (e.g., partially or completely filled) with thermoplastic material (e.g., thermoplastic hotmelt material) prior to addition of fusion spliced optical fibers. FIG. 7E is a perspective view of the strength member 110 and polymeric tape 126 of FIG. 7D, with addition of thermoplastic hotmelt material 128 to the internal cavity and internal cavity extension 124A of the strength member 110. The presence of pre-loaded thermoplastic hotmelt material 128 may avoid the formation of bubbles or voids following insertion of spliced optical fibers into the internal cavity and internal cavity extension 124 of the strength member 110. The remaining portions of the strength member 110 were described previously in connection with FIGS. 7A-7B.

FIG. 8A is a perspective view of a splice protector including the strength member 110 of FIGS. 7A-7B covering a fusion splice region 133 between first and second sections 131, 132 of optical fibers segments 139, 140. The thermoplastic hotmelt material 128 is arranged within the strength member 110 (e.g., in the internal cavity between the first and second wall portions 115, 116, and in the internal cavity extension between the first and second wall portion extensions 115A, 116A) to encase previously stripped portions 135, 136 of the optical fibers 139, 140 as well as unstripped portions 138 of the optical fibers 139, 140. As shown, portions of the thermoplastic hotmelt material 128 may extend beyond the first and second ends 113, 114 of the strength member 110. In certain embodiments, the strength member 110 and pre-loaded thermoplastic hotmelt material 128 may be heated to soften the thermoplastic hotmelt material 128 prior to introduction of the fusion spliced optical fibers 139, 140 into the strength member 110, and thereafter allowed to cool to permit the thermoplastic hotmelt material 128 to solidify around the previously stripped portions 135, 136 and unstripped portions 138 of the optical fibers 139, 140.

FIG. 8B is a cross-sectional view of a portion of the strength member 110, optical fibers 139A-139L, and thermoplastic hotmelt material 128 shown in FIG. 8A. The optical fibers 139A-139L are encased in an overcoating 129 of thermoplastic hotmelt material (to form a ribbon), which is further surrounded by thermoplastic hotmelt material 128 pre-loaded within the strength member 110 between the first and second wall portions 115, 116. In certain embodiments, the pre-loaded thermoplastic hotmelt material 128 may be compositionally identical to the overcoating 129; in other embodiments, the thermoplastic hotmelt material 128 and overcoating 129 may be compositionally different. FIG. 8B depicts the first and second wall portions 115, 116 being joined along first edges 120, 121 by the first edge portion 122, with the second edges 118, 119 being unconnected to bound the longitudinal opening 125 that permits the optical fibers 139A-139L to be received within the strength member 110.

In certain embodiments, the first and second wall portion extensions 115A, 116A of the strength member 110 as described herein may be no more than 0.5 mm wider, no more than 0.3 mm wider, or no more than 0.2 mm wider than an overall width of a coated array of spliced optical fibers (e.g., optical fibers 139, 140) received within the strength member 110. In certain embodiments, the strength member 110 may comprise maximum cross-sectional dimensions of 0.7 mm thick by 3.5 mm wide (with the width reduced to 3.2 mm in the second section of the strength member), with the strength member 110 being configured to contain up two twelve fusion spliced optical fibers in a one-dimensional array.

In certain embodiments, a strength member 110 may be configured to contain multiple fusion spliced optical fibers arranged in a one-dimensional array. In certain embodiments, a strength member 110 may be configured to contain multiple fusion spliced optical fibers arranged in a two-dimensional array (e.g., including or more two parallel rows of fusion spliced optical fibers). In certain embodiments, a strength member may be configured to receive any suitable number of fusion spliced optical fibers, such as 2, 4, 6, 8, 12, 16, 24, 32, 48, or more fusion spliced optical fibers.

In certain embodiments, a multi-fiber ferrule stub including a multi-fiber ferrule in which a first plurality of optical fibers are terminated may be prefabricated, and stripped end portions of the first plurality of optical fibers may be fusion spliced with stripped end portions of a second plurality of optical fibers, with the fusion spliced optical fibers being inserted into a strength member as disclosed herein. Such steps may be used as part of a method for fabricating a fiber optic cable assembly incorporating a multi-fiber connector such as a MPO-type connector.

FIG. 9A is a top plan view of a multi-fiber ferrule stub 141 including a multi-fiber ferrule 142 in which ends of a first plurality of optical fibers 148 are terminated (e.g., flush with a proximal end 143 of the multi-fiber ferrule 142) at a position between two protruding alignment pins 145. The alignment pins 145 are retained by a pin clamp 134 that is adjacent to a distal end 144 of the multi-fiber ferrule 142. Lengths of the optical fibers 148 having stripped end portions 149 and cleaved ends 150 extend from the pin clamp 134 in a direction away from the multi-fiber ferrule 142. In certain embodiments, the optical fibers 148 may have a length of no greater than 20 mm from the pin clamp 134 to the cleaved ends 150. Restated, the optical fibers 148 may have a length of no greater than 20 mm from the pin clamp 134 to splice joints of the optical fibers. In certain embodiments, the pin clamp 134 (which is suitable for holding the alignment pins 145 to produce a male MPO-type connector) may be replaced with a spacer (not shown) to produce a female MPO-type connector, wherein the optical fibers 148 have a length of no greater than 20 mm from the spacer to splice joints of the optical fibers. In certain embodiments, the pin clamp and spacer may both be omitted, and the optical fibers 148 have a length of no greater than 20 mm from the multi-fiber ferrule 142 to splice joints of the optical fibers. Optionally, portions of the first plurality of optical fibers 148 may be ribbonized with thermoplastic material (not shown).

FIG. 9B is a perspective view of the strength member 110 of FIGS. 7A-7B arranged proximate to (i) the multi-fiber stub 141 of FIG. 9A and (ii) a second plurality of optical fibers 152 following fusion splicing between stripped end portions 149, 153 of the first and second pluralities of optical fibers 148, 152 to join ends thereof at a splice region 151. The stripped end portions 149, 153 may be overcoated with thermoplastic hotmelt material (not shown). As illustrated, the proximal end 143 of the multi-fiber ferrule 142 includes polished ends 147 of the first plurality of optical fibers 148 arranged in a one-dimensional array between the alignment pins 145 protruding from the proximal end 143. The strength member 110 (including the internal cavity extension 124A and the internal cavity (not shown, but bounded by the first edge portion 122)) is pre-loaded with thermoplastic hotmelt material 128 and is positioned with the longitudinal opening 125 facing the splice region 151 to receive portions of the first and second pluralities of optical fibers 148, 152. As shown, the first end 113 of the strength member 110 may be proximate to the pin clamp 134 (which is proximate to the multi-fiber ferrule 142), with the second end 114 arranged distal from the pin clamp 134 and multi-fiber ferrule 142. The edge boundary 123 of the first edge portion 122 may be positioned approximately midway between ends of the stripped end portions 149, 153 of the first and second pluralities of optical fibers 148, 152.

FIGS. 9C-9D are upper perspective and lower perspective views, respectively, of a subassembly 155 comprising the multi-fiber ferrule 142, fusion spliced optical fibers (including optical fibers 152 as shown), and strength member 110 of FIG. 9B, with the strength member 110 arranged to protect the fusion splice region 151 (shown in FIG. 9B) and previously stripped sections 149, 153 (shown in FIG. 9B) of the optical fibers 152. The first end 113 of the strength member 110 may be arranged against, or proximate to, the pin clamp 134 adjacent to a distal end 144 of the multi-fiber ferrule 142, with the second end 114 of the strength member 110 being arranged distal from the pin clamp 134 and the multi-fiber ferrule 142. The remaining elements of FIGS. 9C-9D were described previously in connection with FIGS. 9A-9B.

As noted previously herein, the strength member of a splice protector as disclosed herein may have compact height and width dimensions that permit it to be utilized in a MPO-type connector that employs conventional MPO connector components. This enables fabrication of a splice-on MPO-type connector that maintains all of the functions, mechanical performance, and physical appearance of a conventional spliceless MPO-type connector.

Figure 10A:
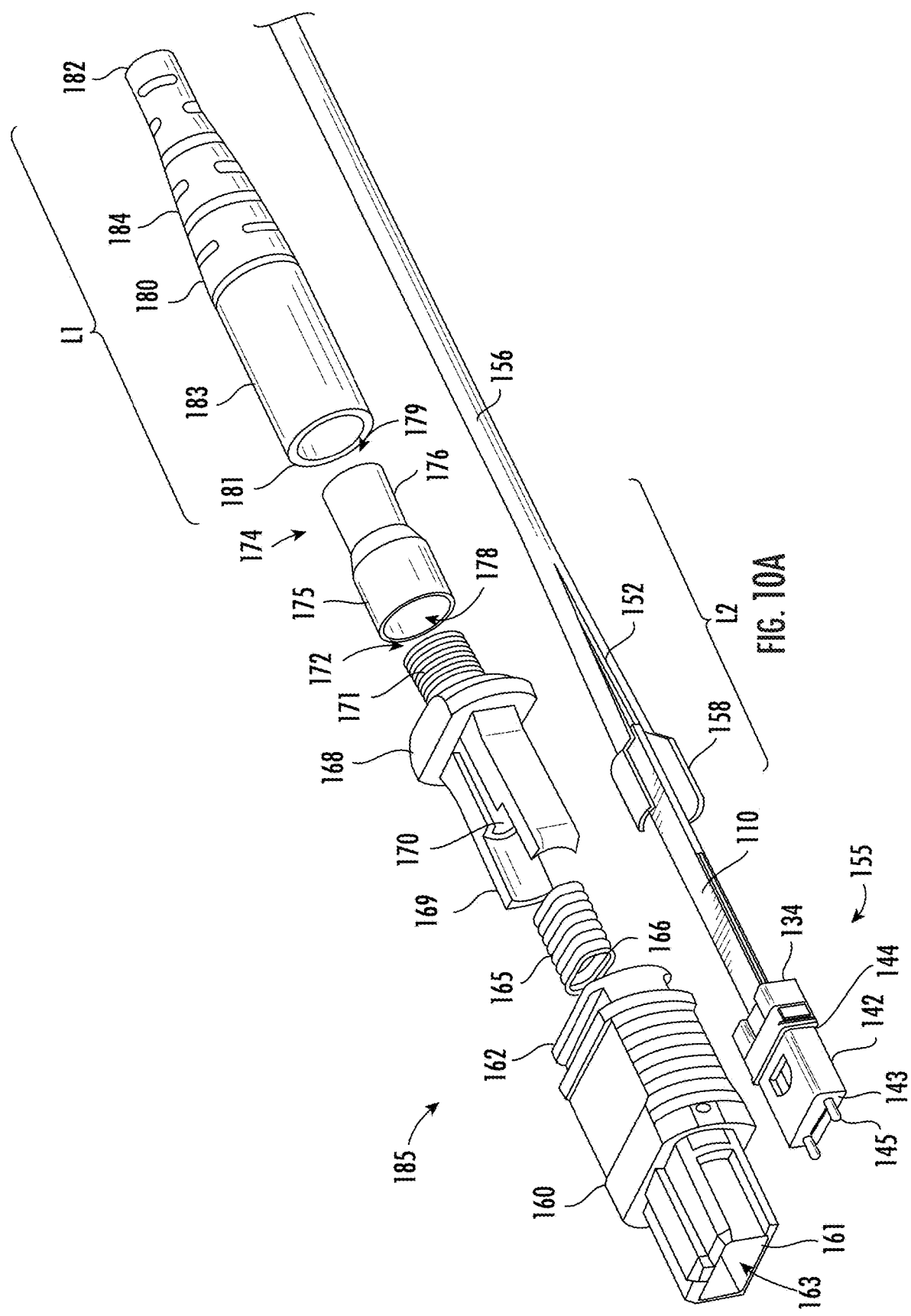
FIG. 10A is a perspective assembly view of at least a portion of a fiber optic cable assembly 185 according to one embodiment including the subassembly of FIGS. 9C-9D modified to depict a split jacket portion partially overlapping the strength member, with the subassembly positioned proximate to components of a MPO-type connector including a connector housing, a spring, a spring push member, a crimp band, and a boot.

FIG. 10A is a perspective assembly view of a portion of a fiber optic cable assembly 185 according to one embodiment, including the subassembly 155 of FIGS. 9C-9D modified to depict a split jacket section 158 (having a length L2) partially overlapping the strength member 110 and optical fibers 152 extending therefrom, with the subassembly 155 positioned proximate to components of a MPO-type connector. The illustrated MPO-type connector components include a connector housing 160, a spring 165, a spring push member 168, a crimp band 174, and a boot 180. The connector housing 160 includes a proximal end 161 and a distal end 162, with an aperture 163 permitting the passage therethrough of the proximal end 143 of the multi-fiber ferrule 142. The spring 165 defines a spring aperture 166 through which the strength member 110 may pass, with the spring 165 being configured to apply a biasing force to the pin clamp 134 and the multi-fiber ferrule 142 when installed within the connector housing 160. The spring push member 168 includes lateral portions 169 configured to be received within the connector housing 160, includes an end portion (or crimp body portion) 171 for receiving the crimp band 174, and defines an aperture 170 through which a portion of the strength member 110 may pass. The crimp band 174 includes a proximal section 175 defining an aperture 178, and a reduced diameter distal section 176 defining a reduced diameter aperture 179. If the crimp band 174 is configured to receive a 3.0 mm outer diameter multi-fiber cable, then the reduced diameter aperture 179 may have a diameter of about 3.3 mm. The boot 180 includes a proximal end 181, and distal end 182, a tubular section 183, and a tapered section 184. The tubular section 183 of the boot 180 is configured to laterally surround the crimp band 174 when the crimp band 174 is received by the crimp body portion 171 of the spring push member 168. The boot comprises a length L1 extending from the proximal end 181 to the distal end 182.

Figure 10B:
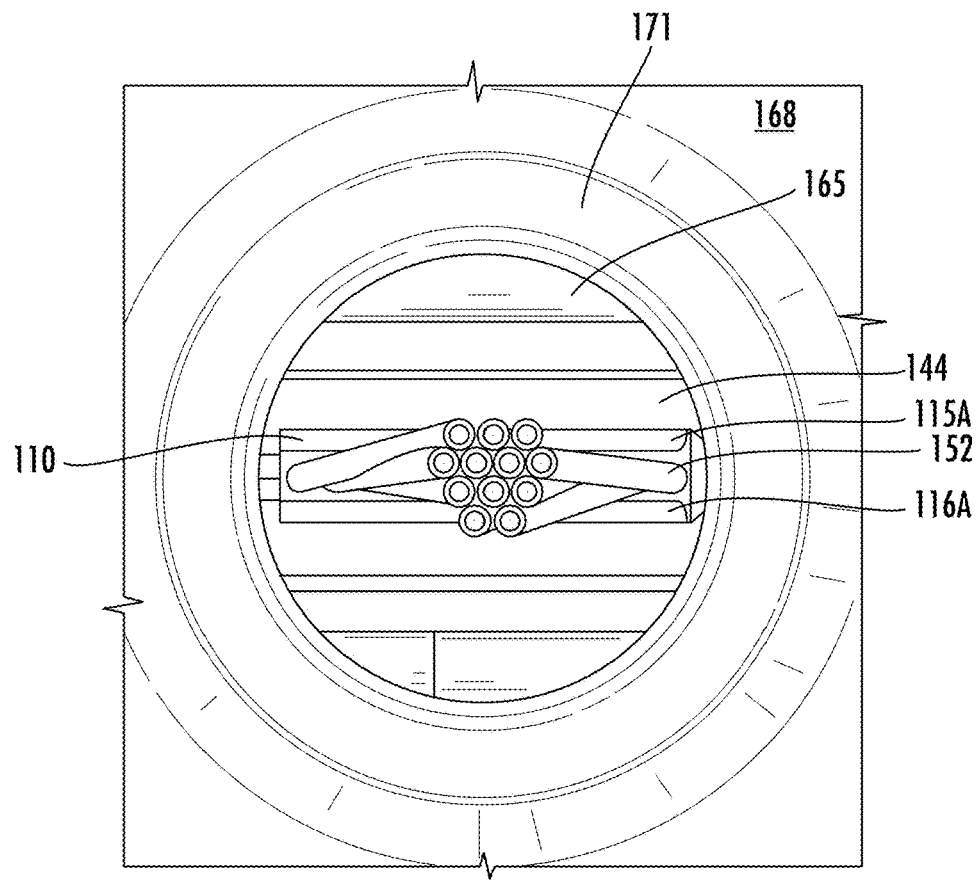
FIG. 10B is a cross-sectional view of a portion of a fiber optic cable assembly according to FIG. 10A during assembly thereof, showing the strength member and optical fibers extending through an aperture defined in a distal portion (e.g., crimp body portion) of the spring push member.
Figure 10C:
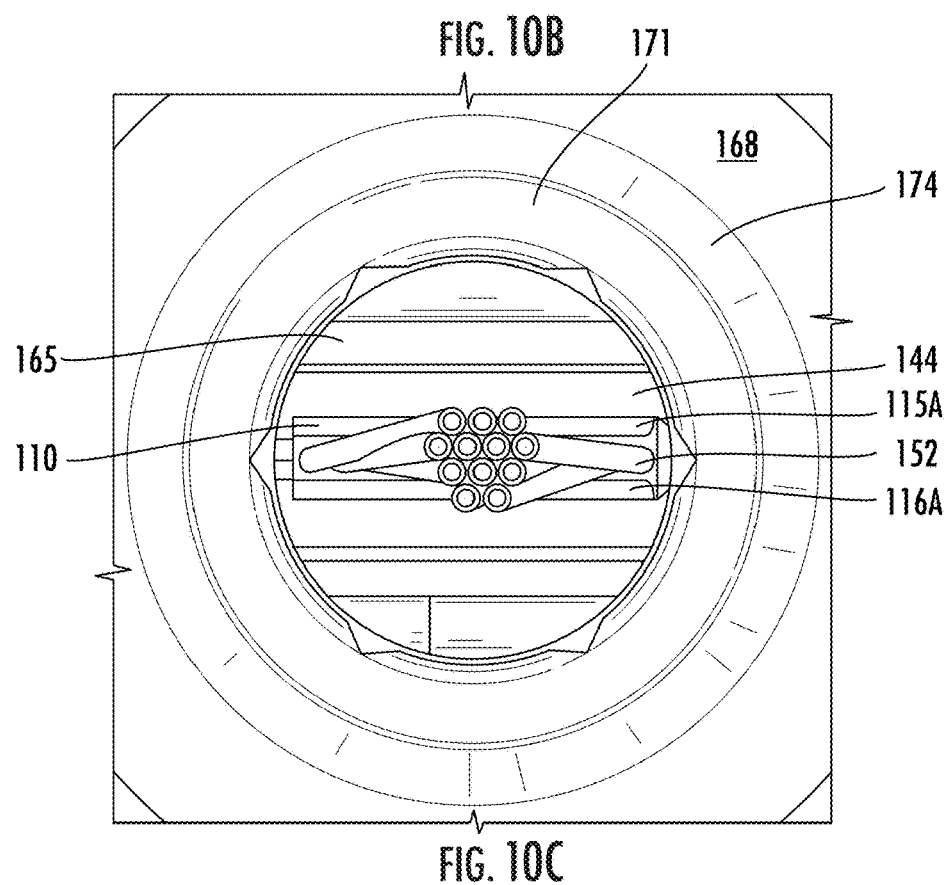
FIG. 10C is a cross-sectional view of a portion of a fiber optic cable assembly according to FIG. 10A during assembly thereof, following addition of a crimp band around the crimp body portion of the spring push member.

FIG. 10B is a cross-sectional view of a portion of the fiber optic cable assembly of FIG. 10A during assembly thereof, looking into the interior of the spring push member 168 (and the crimp body portion 171 thereof) toward the proximal direction. The first and second wall portion extensions 115A, 116A of the strength member 110 are shown, with optical fibers 152 extending from the strength member 110 in the distal direction. As shown, the strength member 110 extends rearward from the distal end 144 of the multi-fiber ferrule and is of sufficiently small height and width dimensions to extend rearwardly through apertures defined in the spring 165 and the spring push member (168 in FIG. 10A). FIG.

10C is a cross-sectional view of the fiber optic cable assembly portion of FIG. 10A, following addition of the crimp band 174 around the crimp body portion 171 of the spring push member 168 (shown in FIG. 10A).

FIG. 10D is a side elevational, partial assembly view of a fiber optic cable assembly 185' generally in accordance with FIG. 10A, with the addition of optional heat shrink tubing 189 that may be positioned to cover a portion of the split jacket section 158 within the boot 180. As shown, the proximal end 143 and alignment pins 145 of the multi-fiber ferrule 142 extend from a proximal end of the connector housing 160, and a portion of the spring push member 168 is received within a distal portion of the connector housing 160, wherein it is to be understood that a spring (e.g., 165 as shown in FIG. 10A) is positioned within the connector housing 160 between the multi-fiber ferrule 142 and the spring push member 168 (and more specifically, between the pin clamp (134 in FIG. 10A) and the spring push member 168). A portion of the strength member 110 (with spliced optical fibers contained therein) extends in a distal direction from the crimp body portion 171 of the spring push member 168. The strength member 110 may have a length of about 25 mm. End portions of the split jacket section 158 extend around the crimp body portion 171 to permit a jacket of a cable 156 containing the optical fibers 152 to be mechanically secured to the crimp body portion 171 when the crimp band 174 is affixed thereto by crimping. As shown, the split jacket section 158 has a length that is shorter than the boot 180, so that the boot 180 will cover an entirety of the split jacket section 158 when the tubular section 183 of the boot 180 is arranged over the crimp band 174 and the crimp body portion 171. In certain embodiments, the split jacket section 158 has a length of no greater than 33 mm, no greater than 25 mm, or no greater than 20 mm. In certain embodiments, an entirety of the split jacket section 158 is arrangeable within the boot 180. In certain embodiments, the optionally present heat shrink tubing 189 extends around a circumference of a portion of the split jacket section 158 but is covered by a boot 180 having a length of no greater than 33 mm, no greater than 25 mm, or no greater than 20 mm. In certain embodiments, the heat shrink tubing 189 may extend around a circumference of a portion of the split jacket section 158, and may or may not extend beyond the boot 180, but an aggregate length from a proximal end 181 of the boot 180 to a distal end of the heat shrink tubing 189 is no greater than 33 mm.

FIG. 10E is a top plan view of the fiber optic cable assembly 185' according to FIGS. 10A and 10E following assembly thereof, showing portions of the multi-fiber ferrule 142 and the spring push member 168 received by the connector housing 160, and with the boot 180 abutting a distal end of the connector housing 160 and covering other components (e.g., the crimp band 174, split jacket section 158, and optionally provided heat shrink tubing 189 shown in FIG. 10D), with a cable 156 extending from the boot 180.

Although various embodiments herein have shown fiber optic cable assemblies incorporating jacketed round fiber optic cables, the present disclosure is not limited to such a configuration. In certain embodiments, fiber optic cable assemblies may incorporate bare ribbons, rectangular ribbon cables, or groups of optical fibers in still other configurations.

FIG. 11A is a perspective assembly view of a portion of a fiber optic cable assembly according to one embodiment, including spliced optical fibers terminated in a multi-fiber ferrule 242, with a spring 265 and a spring push member 268 surrounding portions of a strength member 110 containing a splice region, and with a fiber ribbon 252 extending past the strength member 110. The multi-fiber ferrule 242 includes a proximal end 243 with protruding alignment pins 245. A pin clamp 234 is provided between a distal end 244 of the multi-fiber ferrule 242 and a spring push member 268. The spring push member 268 includes lateral portions 269 with locking tabs 267 configured to be received within a connector housing (260 as shown in FIG. 11C), and includes a crimp body portion 271 and a shoulder 271A. The strength member 110 extends through an oval-shaped aperture 272 defined in the spring push member 268.

FIG. 11B is a rear elevational view of the fiber optic cable assembly portion of FIG. 11A, looking into the interior of the spring push member (268 in FIG. 11A) in the proximal direction. The first and second wall portion extensions 115A, 116A of the strength member 110 are shown, with optical fibers extending from the strength member 110 in the distal direction. The strength member 110 extends rearward from a distal end of the multi-fiber ferrule 242 and is of sufficiently small height and width dimensions to extend through an oval-shaped aperture defined in the spring 265 and through the aperture 272 defined by the spring push member 268.

FIG. 11C is a top plan view of the fiber optic cable assembly portion of FIG. 11A, following insertion of a connector housing 260 over the multi-fiber ferrule 242 to engage the spring push member (268 in FIG. 11A) to form at least a portion 285 of a MPO-type connector. The strength member 110 and fiber ribbon 252 extend in a distal direction from the crimp body portion 271, with the strength member 110 protruding a short distance past the crimp body portion 271 away from the multi-fiber ferrule 242. If desired, split portions of a jacket (not shown) may be affixed over the crimp body portion 271, a crimp band (not shown) may be added to secure a jacket to the spring push member, and a boot (280 as shown in FIG. 12) may be affixed over the fiber ribbon 252.

FIG. 12 is a top plan view of at least a portion of a fiber optic cable assembly 285' incorporating the elements shown in FIG. 11C, with addition of a boot 280 covering a portion of the spring push member (217 in FIG. 11C) and a jacket 258 covering the fiber ribbon (252 in FIG. 11C) to form a rectangular ribbon cable extending from the boot 280. The boot 280 includes a constant width portion 283 proximate to a first end 281 and a tapered portion 284 that extends to a second end 282. In certain embodiments, the boot 280 may engage the shoulder (271A in FIG. 11A). In operation, a MPO-type connector portion of the fiber optic cable assembly 285' may be pushed in a proximal direction (e.g., to insert the multi-fiber ferrule 242 and alignment pins 245 into a female receptacle (not shown)) by pushing the boot 280, and may be pulled in a distal direction by pulling the connector housing 260 (e.g., to disengage the multi-fiber ferrule 242 and alignment pins 245 from a female receptacle).

In certain embodiments, a fixture may be used to align and position optical fibers of a multi-fiber cable for mass fusion splicing during fabrication of a multi-fiber cable segment as disclosed herein.

Figure 13A:
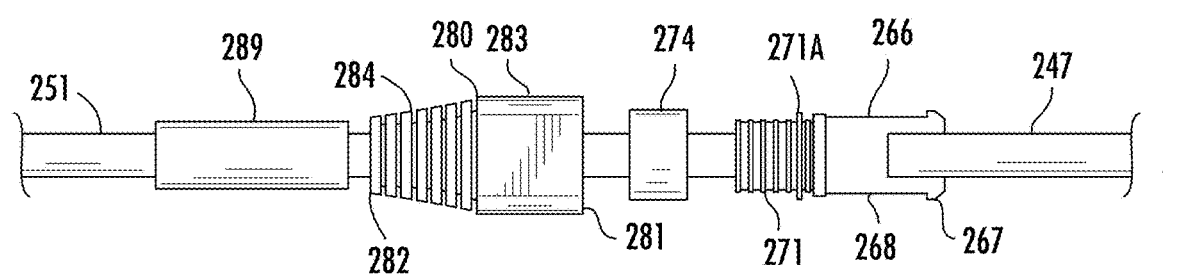
FIG. 13A is top plan view of a multi-fiber cable segment and a first group of components in preparation for fabrication of a splice-on fiber optic cable assembly incorporating a splice protector and multiple fusion spliced optical fibers within a MPO-type connector according to one embodiment.

FIG. 13A is a top plan view of a multi-fiber cable segment 251 and a first group of components (i.e., a heat shrink tubing segment 289, a boot 280, a crimp band 274, and a spring push member 268) slid onto the multi-fiber cable segment 251 in preparation for fabrication of a fiber optic cable assembly as disclosed herein. A portion 247 of the multi-fiber cable segment 251 may be subjected to a jacket splitting operation after components of the above-mentioned first group of components are slid past the portion 247. The boot 280 may comprise a constant width portion 283 proximate to a first end 281 and a tapered portion 284 proximate to a second end 282. The spring push member 268 includes lateral portions 266 with locking tabs 267 (configured to be received within a connector housing (not shown)) and includes a crimp body portion 271 and a shoulder 271A. In certain embodiments, the items shown in FIG. 13A may be used in combination with a multi-fiber ferrule stub (e.g., as shown in FIG. 9A) to fabricate a multi-fiber cable assembly as disclosed herein.

Figure 13B:
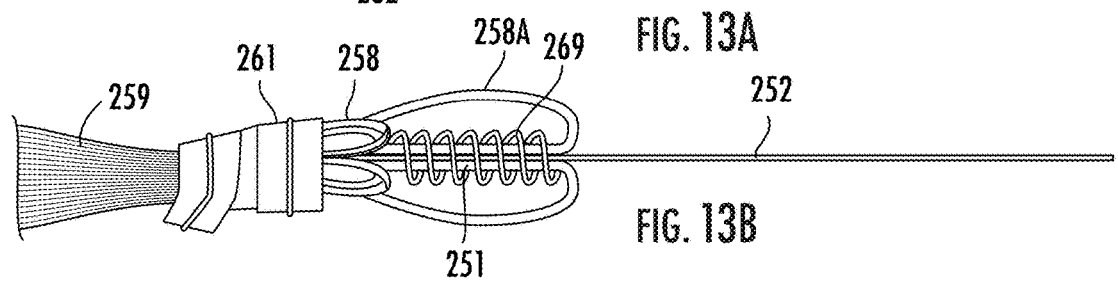
FIG. 13B is a top plan view of the multi-fiber cable segment of FIG. 13A following splitting and rearward folding of a jacket of the cable segment to expose optical fibers in preparation for insertion of the optical fibers into an alignment fixture.
Figure 13C:
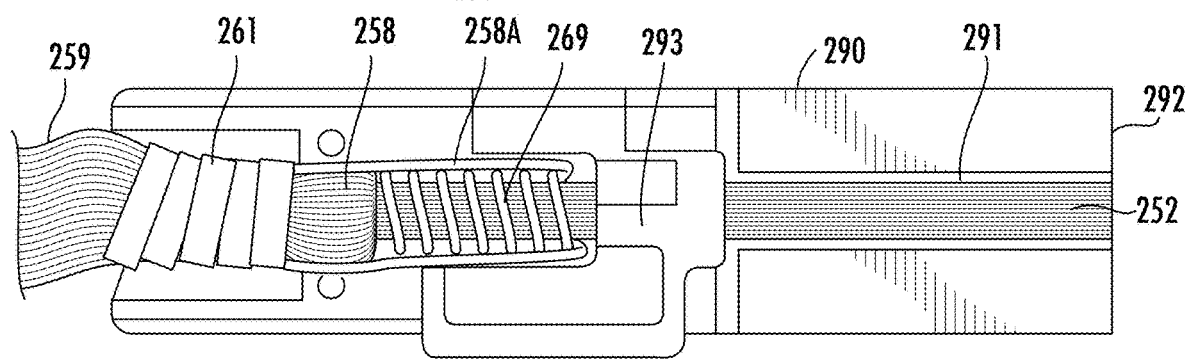
FIG. 13C is a top plan view of the cable segment of FIG. 13B received within an alignment fixture in preparation for mass fusion splicing of optical fibers thereof.

FIG. 13B is a top plan view of the multi-fiber cable segment of FIG. 13A (with the first group of components shifted leftward and out of view) following addition of a spring 269 over a portion of the cable segment, and splitting and rearward folding of a portion (e.g., about 50 mm) of a jacket 258 to expose optical fibers 252 in preparation for insertion of the optical fibers 252 into a fixture (290 in FIG. 13C). The multi-fiber cable segment 251 includes an optical fiber ribbon within a furcation tube 258A that is surrounded by tensile members 259 and an outer jacket 258. Splitting of the outer jacket 258 also exposes tensile members 259 (e.g., Aramid or Kevlar yarn or fibers) that emanate from the cable segment (251 in FIG. 13A). The furcation tube 258A is also split to expose the optical fibers 252. In this embodiment, the spring 269 fits around the furcation tube 258A but not the jacket 258, while split ends of the outer jacket 258 and the tensile members 259 are temporarily retrained within a wrapping member 261. Portions of the optical fibers 252 may be sorted, ribbonized, and stripped, and ends thereof may be cleaved, in preparation for fusion splicing.

FIG. 13C is a top plan view of the cable segment of FIG. 13B received within an alignment fixture 290 in preparation for mass fusion splicing of exposed optical fibers 252. The alignment fixture 290 includes a channel 291 terminating at an end 292 of the alignment fixture 290, with the channel 291 receiving the optical fibers (252 in FIG. 13B) in a one-dimensional array. The alignment fixture 290 includes a clamp 293 that retains the optical fibers 252, with the alignment fixture 290 serving to align the optical fibers 252 in preparation for placing them into a handler of a mass fusion splicing apparatus (not shown). As shown, the spring 269 and wrapping member 261 may be used to restrain split portions of the outer jacket 258, the furcation tube 258A, and the strength member 259 while the optical fibers 252 are held by the clamp 293 of the alignment fixture 290.

Figure 14A:
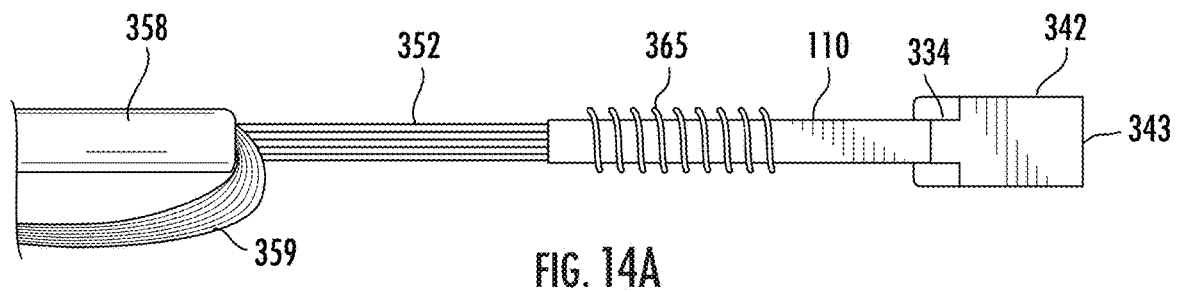
FIG. 14A is a top plan view of multiple fusion spliced optical fibers extending through a strength member and a spring into a multi-fiber ferrule.

FIGS. 14A-14D depict various steps in fabrication of a fiber optic cable assembly that includes multiple fusion spliced optical fibers 352 according to one embodiment. FIG. 14A is a top plan view of multiple fusion spliced optical fibers 352 extending through a strength member 110 and a spring 365 to a pin clamp 334 and a multi-fiber ferrule 342, wherein ends of the fusion spliced optical fibers 352 may be terminated (e.g., and polished) flush with a proximal face 343 of the multi-fiber ferrule 342. The fusion spliced optical fibers 352 emanate from a rectangular fiber optic cable (356 in FIG. 14D) having a split jacket portion 358 and tensile members 359.

Figure 14B:
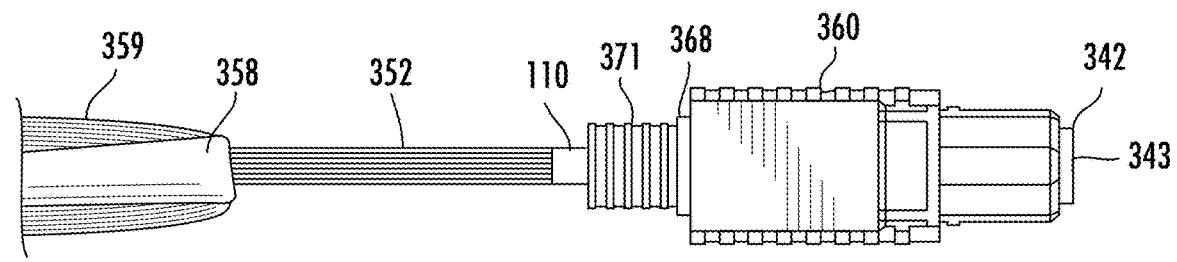
FIG. 14B is a top plan view of the items of FIG. 14A following addition of a spring push member and connector housing over the strength member, with the multi-fiber ferrule received within a portion of the connector housing.

FIG. 14B is a top plan view of the items of FIG. 14A following addition of a spring push member 368 (having a crimp body portion 371) and a connector housing 360 over a strength member 110, with the multi-fiber ferrule 342 received within a portion of the connector housing 360. The spring push member 368 may be mechanically engaged to the connector housing 360.

Figure 14C:
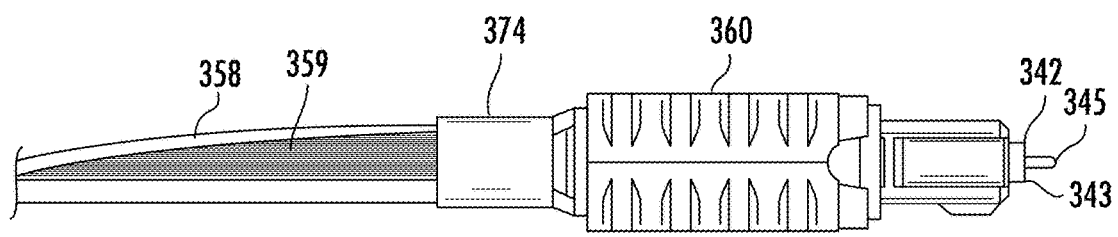
FIG. 14C is a side elevational view of the items of FIG. 14B after affixing a crimp band around ends of the split jacket and a crimp body portion of the spring push member, and addition of alignment pins to the multi-fiber ferrule.

FIG. 14C is a side elevational view of the items of FIG. 14B after affixing a crimp band 374 around ends of the split jacket portion 358 and tensile members 359 over the crimp body portion (371 in FIG. 14B) of the spring push member, and addition of alignment pins 345 to the multi-fiber ferrule 342. Presence of the crimp band 374 around ends of the split jacket portion 358 and the tensile members 359 over the crimp body portion (371 in FIG. 14B) provides a mechanical connection between the rectangular fiber optic cable (356 in FIG. 14D) and the spring push member (368 in FIG. 14B).

Figure 14D:
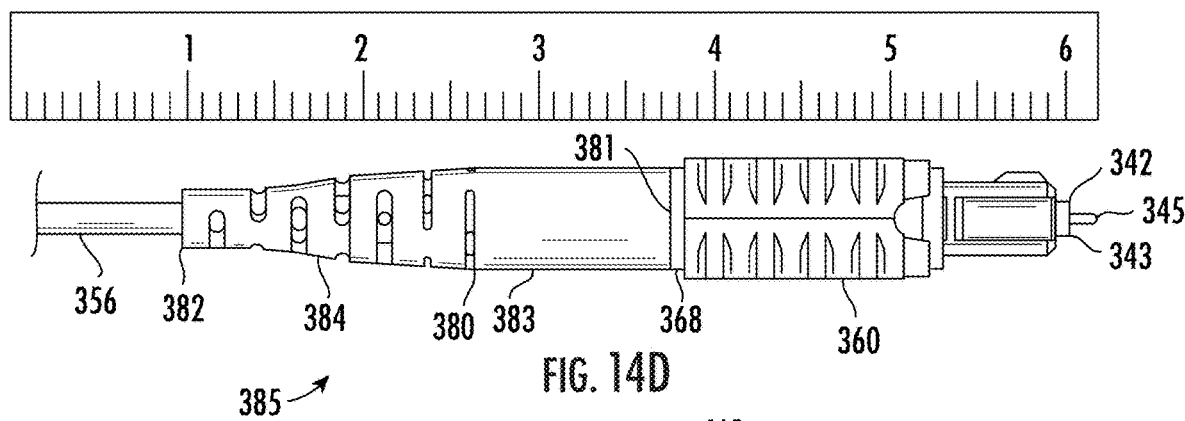
FIG. 14D is a side elevational view of the items of FIG. 14C following addition of a boot over the crimp band and to cover the split portion of the jacket according to one embodiment.

FIG. 14D is a side elevational view of the items of FIG. 14C following addition of a boot 380 over the crimp band (374 in FIG. 14C) and to cover the split jacket portion 358 of the fiber optic cable 356 to form a fiber optic cable assembly 385 incorporating a MPO-type connector containing multiple spliced optical fibers according to one embodiment. The boot 380 includes a constant width portion 383 proximate to a first end 381 and a tapered portion 384 that extends to a second end 382, with the fiber optic cable 356 extending past the second end 382 of the boot 380. As shown, the boot 380 may have a total length of about 28 mm, and a MPO connector may have a total length of about 60 mm from a second end 382 of the boot 380 to a proximal face 343 of the multi-fiber ferrule 342, and an entirety of the split jacket portion (358 in FIG. 14C) is contained within the boot 380. The dimensions of the boot 380 for a rectangular cable (e.g., rectangular fiber optic cable 456) may differ from those of boots suitable for round cables.

Figure 15:
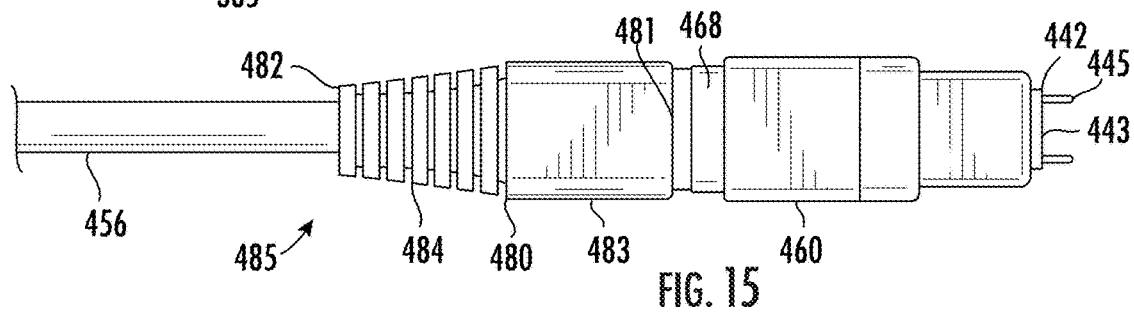
FIG. 15 is a top plan view of a portion of a fiber optic cable assembly incorporating a strength member covering multiple fusion spliced optical fibers within a MPO-type connector according to one embodiment.

FIG. 15 is a top plan view of a portion of a fiber optic cable assembly 485 incorporating a strength member (110 in FIG. 14B) covering multiple fusion spliced optical fibers (352 in FIG. 14B) within a MPO-type connector according to one embodiment. The fiber optic cable assembly 485 includes a multi-fiber ferrule 442 having alignment pins 445 protruding from a proximal end 443, with the multi-fiber ferrule 442 and a spring push member 468 both received by a connector housing 460. A boot 480 (having a constant width portion 483 and a tapered width portion 484) is received by a portion of the spring push member 468, and a multi-fiber ribbon cable 456 protrudes from a distal end 482 of the boot 480. In certain embodiments, a split portion of a jacket of the multi-fiber ribbon cable 456 may be fully contained within the boot 480 without need for heat shrink tubing. In other embodiments, heat shrink tubing (not shown) may be at least partially arranged within the boot 480 to cover a split portion of a jacket of the multi-fiber ribbon cable 456, with the heat shrink tubing either being fully covered by the boot 480, or extending a short distance past the distal end 482 of the boot 480. In the latter instance, a total combined length from a proximal end 481 of the boot 480 to a distal end of the heat shrink tubing may be no greater than 33 mm.

Figure 16A:
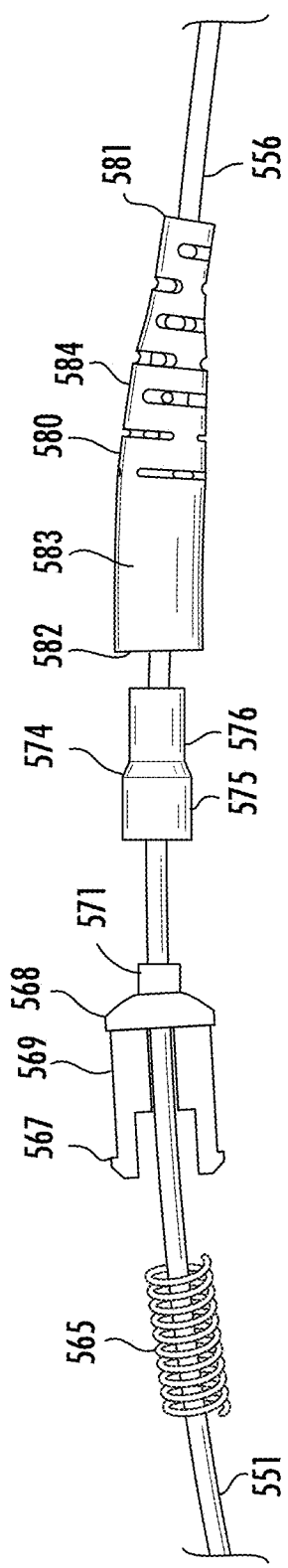
FIG. 16A is a top plan assembly view of multi-fiber cable segment and a group of components in preparation for fabrication of a fiber optic cable assembly incorporating a splice protector and multiple fusion spliced optical fibers a MPO-type connector according to one embodiment.

FIG. 16A is a top plan view of a multi-fiber cable segment 556 and a first group of components (i.e., a boot 580, a crimp band 574, a spring push member 568, and a spring 565) slid onto the multi-fiber cable segment 556 in preparation for fabrication of a fiber optic cable assembly as disclosed herein. A portion 551 of the multi-fiber cable segment 556 (which is a round cable containing loose optical fibers) may be subjected to a jacket splitting operation after components of the above-mentioned first group of components are slid past the portion 551. The boot 580 may comprise a constant width portion 583 proximate to a first end (pr proximal end) 581 and a tapered width portion 584 proximate to a second end (or distal end) 582. The crimp band 574 includes a larger diameter portion 575 and a reduced diameter portion 576. The spring push member 568 includes lateral portions 569 with locking tabs 567 (configured to be received within a connector housing (not shown)) and includes a crimp body portion 571 configured to receive the crimp band 574. In certain embodiments, the items shown in FIG. 16A may be used in combination with a multi-fiber ferrule stub (e.g., as shown in FIG. 9A) to fabricate a multi-fiber cable assembly as disclosed herein.

Figure 16B:
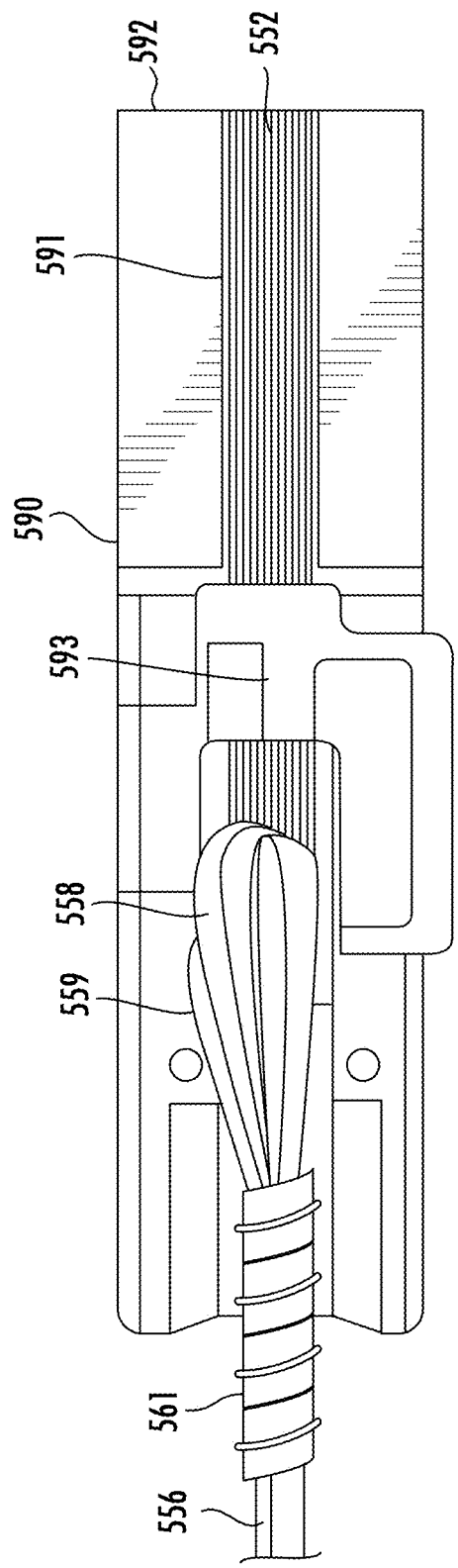
FIG. 16B is a top plan view of the cable segment of FIG. 16A received within an alignment fixture in preparation for mass fusion splicing of optical fibers thereof.

FIG. 16B is a top plan view of the cable segment 556 of FIG. 16A received within an alignment fixture 590 in preparation for mass fusion splicing of exposed optical fibers 552. The alignment fixture 590 includes a channel 591 terminating at an end 592 of the fixture 590, with the channel 591 receiving the optical fibers 552 in a one-dimensional array. The alignment fixture 590 includes a clamp 593 that retains the optical fibers 552, with the alignment fixture 590 serving to align the optical fibers 552 in preparation for placing them into a handler of a mass fusion splicing apparatus (not shown). Split portions of the jacket 558 as well as strength member 559 emanating from the multi-fiber cable segment 556 are restrained by a wrapping member 561 while the optical fibers 552 are held by the clamp 593 of the alignment fixture 590. Portions of the optical fibers 552 may be sorted, ribbonized, and stripped, and ends thereof may be cleaved, in preparation for fusion splicing.

Figure 16C:
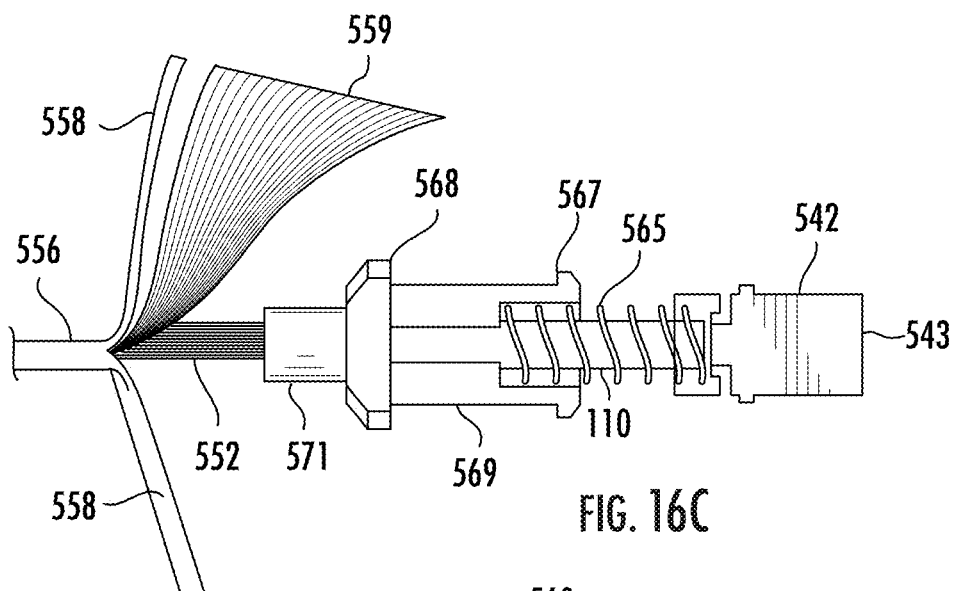
FIG. 16C is a top plan view of multiple fusion spliced optical fibers extending through a strength member inserted through a spring and a spring push member, with the optical fibers terminated in a multi-fiber ferrule, and with tensile members and split jacket portions of a fiber optic cable segment positioned apart from the spring push member.

FIG. 16C is a top plan view of multiple fusion spliced optical fibers 552 extending through a strength member 110 inserted through the spring 565 and the spring push member 568 (previously described in connection with FIG. 16A), with the fusion spliced optical fibers 552 terminated (and polished) along a proximal face 543 of a multi-fiber ferrule 542. Although the multi-fiber ferrule 542 is shown as lacking alignment pins protruding from the proximal face 543, it is to be appreciated that alignment pins may be added in certain embodiments. As shown, tensile members 559 and split jacket portions 558 of the fiber optic cable segment 556 are positioned apart from a crimp body portion 571 of the spring push member 568.

Figure 16D:
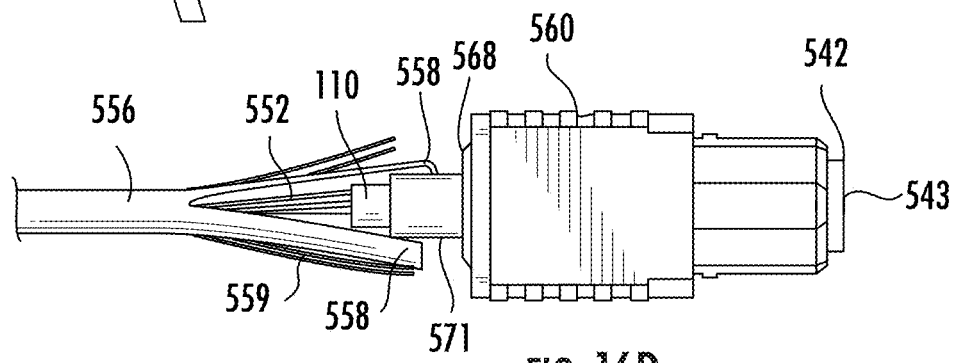
FIG. 16D is a top plan view of the items of FIG. 16C following positioning of tensile members and split jacket portions proximate to the crimp body portion of the spring push member, and following addition of a connector housing to receive portions of the multi-fiber ferrule and the spring push member.

FIG. 16D is a top plan view of the items of FIG. 16C following positioning of the tensile members 559 and split jacket portions 558 proximate to the crimp body portion 571 of the spring push member 568, and following addition of a connector housing 560 to receive portions of the multi-fiber ferrule 542 and the spring push member 568. A portion of the strength member 110 used to protect the fusion spliced optical fibers 552 and protruding in a distal direction from the crimp body portion 571 is also shown.

Figure 16E:
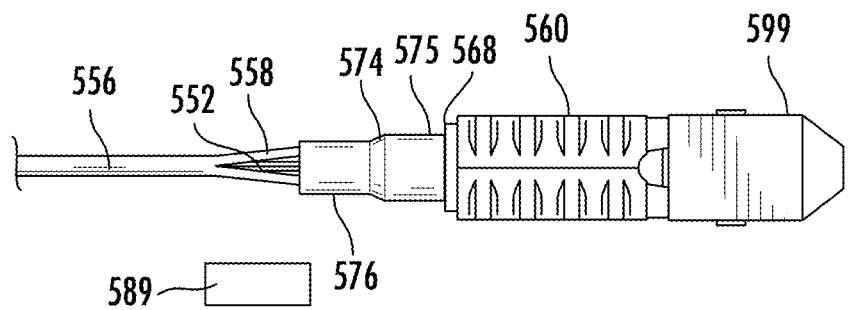
FIG. 16E is a side elevational view of the items of FIG. 16D, following addition of a crimp band to compress the split jacket portion and tensile members against the crimp body portion of the spring push member, and following addition of a cover over a proximal end of the multi-fiber ferrule, with depiction of an optional heat shrink tubing segment that may be provided to cover the split jacket portion of the multi-fiber cable.

FIG. 16E is a side elevational view of the items of FIG. 16D, following addition of a crimp band 574 to compress the split jacket portions (558 in FIG. 16C) and tensile members (559 in FIG. 16C) against the crimp body portion (571 in FIG. 17D) of the spring push member (568 in FIG. 16C), and following addition of a cover 599 over a proximal end of the multi-fiber ferrule (541 in FIG. 16D). As shown, a split portion of the multi-fiber cable segment 556 extends beyond the crimp band 574. An optional heat shrink tubing segment 589 that may be positioned to cover the split jacket portion of the multi-fiber cable segment 556 is also shown.

Figure 16F:
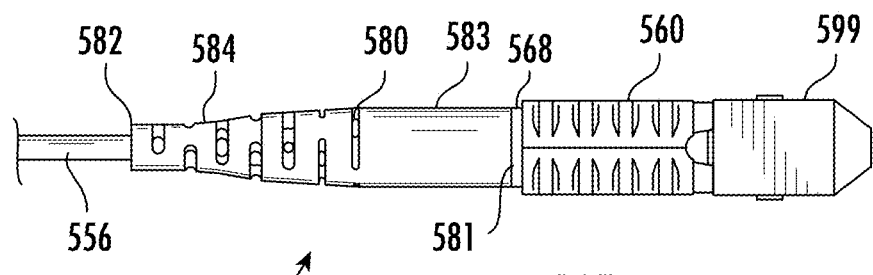
FIG. 16F is a side elevational view of the items of FIG. 16E following addition of a boot over the crimp band.

FIG. 16F is a side elevational view of the items of FIG. 16E following addition of a boot 580 over the crimp band (574 in FIG. 16E) to yield a fiber optic cable assembly 585 incorporating a MPO-type connector containing multiple fusion spliced optical fibers and a splice protector therein. The boot 580 includes a proximal end 581, a distal end 582, a constant width portion 583, and a tapered width portion 584. The cover 599 may serve to protect terminated optical fibers of the multi-fiber ferrule (542 in FIG. 16D), and may be removed at the point of deployment of the fiber optic cable assembly 585.

In certain embodiments, a push-pull boot may be engaged with a connector housing of a fiber optic cable assembly incorporating a splice protector and multiple fusions spliced optical fibers within a MPO-type connector as disclosed herein, to permit a MPO-type connector to be pushed or pulled via the push-pull boot.

Figure 17A:
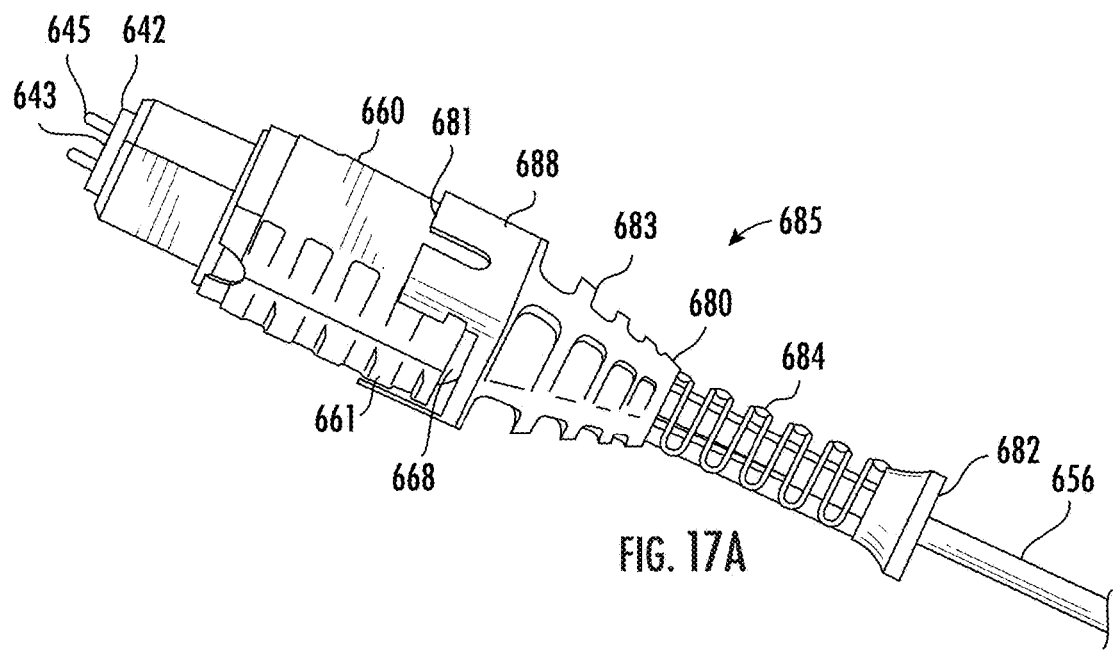
FIG. 17A is a perspective view of a portion of a fiber optic cable assembly incorporating a splice protector covering multiple fusion spliced optical fibers within a MPO-type connector having a push-pull boot engaged with a connector housing according to one embodiment.
Figure 17B:
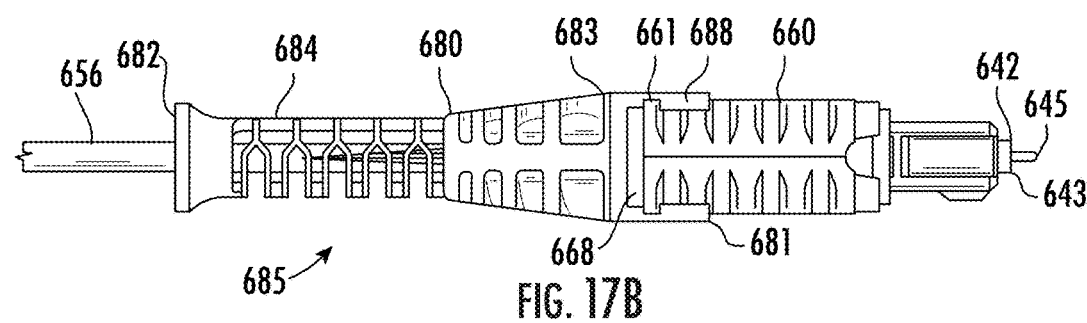
FIG. 17B is a side elevational view of the fiber optic cable assembly portion of FIG. 17A.

FIGS. 17A-17B are perspective and side elevational views, respectively, of a portion of a fiber optic cable assembly 685 incorporating a strength member (e.g., 110 shown in FIGS. 7A-7B) to protect multiple fusion spliced optical fibers within a MPO-type connector having a multi-fiber ferrule 642 (with alignment pins 645 protruding from a proximal face 643) and having a push-pull boot 680 engaged with a connector housing 660. The connector housing 660 contains a portion of a spring push member 668. The connector housing 660 additionally includes receiving features 661 configured to receive housing engagement portions 688 of the push-pull boot 680. The push-pull boot 680 has a first end 681 and a second end 682, with the housing engagement portions 688, a tapered transition portion 683, and a reduced diameter portion 684 sequentially arranged between the first and second ends 681, 682. A multi-fiber cable 656 extends from the second end 682 of the push-pull boot 680. The tapered transition portion 683 and the reduced diameter portion 684 of the push-pull boot 680 may comprise webbed surfaces to confer flexibility and increased friction to facilitate manual grasping of the push-pull boot 680 by a user. In certain embodiments, the push-pull boot 680 may be used with either a 3.0 mm diameter or 2.0 mm diameter multi-fiber cable 656. In certain embodiments, heat shrink tubing (not shown) may be provided over a split jacket portion (not shown) of the multi-fiber cable 656 within the push-pull boot 680. In operation, a MPO-type connector of the fiber optic cable assembly 685 may be pushed in a proximal direction (e.g., to insert the multi-fiber ferrule 642 and alignment pins 645 into a female receptacle (not shown)) by pushing the push-pull boot 680, and may be pulled in a distal direction by pulling the push-pull boot 680 (e.g., to disengage the multi-fiber ferrule 642 and alignment pins 645 from a female receptacle).

Figure 18:
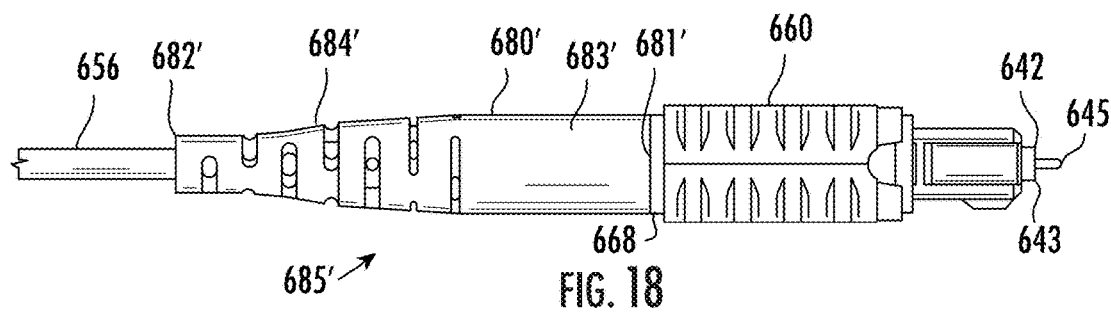
FIG. 18 is a perspective view of a portion of a fiber optic cable assembly incorporating a splice protector covering multiple fusion spliced optical fibers within a MPO-type connector according to one embodiment.

FIG. 18 is a perspective view of a portion of a fiber optic cable assembly 685' incorporating a splice protector (e.g., 110 shown in FIGS. 7A-7B) covering multiple fusion spliced optical fibers within a MPO-type connector according to one embodiment, with the fiber optic cable assembly 685' being substantially similar to the fiber optic cable assembly 685 of FIGS. 17A-17B but substituting a boot 680' that does not provide push-pull utility. A multi-fiber ferrule 642 (with alignment pins 645 protruding from a proximal face 643) is received by a connector housing 660. The connector housing 660 also contains portions of a spring push member 668. A boot 680' engaged with the spring push member 668 includes a first end 681' and a second end 682', with a constant width portion 683' and a tapered with portion 684' arranged therebetween, wherein a multi-fiber cable 656 extends from the second end 682' of the boot 680'. Any split jacket portion (not shown) of the multi-fiber cable 656 is arranged within the boot 680.

Those skilled in the art will appreciate that various modifications and variations can be made without departing from the spirit or scope of the invention. Since modifications, combinations, sub-combinations, and variations of the disclosed embodiments incorporating the spirit and substance of the invention may occur to persons skilled in the art, the invention should be construed to include everything within the scope of the appended claims and their equivalents. The claims as set forth below are incorporated into and constitute part of this detailed description.

It will also be apparent to those skilled in the art that unless otherwise expressly stated, it is in no way intended that any method in this disclosure be construed as requiring that its steps be performed in a specific order. Accordingly, where a method claim below does not actually recite an order to be followed by its steps or it is not otherwise specifically stated in the claims or descriptions that the steps are to be limited to a specific order, it is no way intended that any particular order be inferred.

What is claimed is:

1. A multi-fiber splice protector comprising:
a strength member comprising (i) a first section comprising a U-shaped cross-sectional shape including a first wall portion, a second wall portion arranged parallel to the first wall portion, and a first edge portion connecting adjacent first edges of the first and second wall portions bounding an internal cavity, wherein adjacent second edges of the first and second wall portions opposing the first edges are unconnected; and (ii) a second section comprising a first wall portion extension that extends in a longitudinal direction relative to the first wall portion and a second wall portion extension that extends in a longitudinal direction relative to the first second portion and is arranged parallel to the first wall portion extension to bound an internal cavity extension, wherein adjacent first edges of the first wall portion extension and the second wall portion extension are unconnected, and wherein adjacent second edges of the first wall portion extension and the second wall portion extension that oppose the first edges are unconnected;
wherein the strength member is bend-resistant, and the second edges of the first wall portion, the second wall portion, the first wall portion extension, and the second wall portion extension bound a longitudinal opening permitting the passage of a plurality of spliced optical fibers into the internal cavity and the internal cavity extension.

2. The multi-fiber splice protector of claim 1, wherein the first section and the second section comprise a unitary metal body.

3. The multi-fiber splice protector of claim 1, wherein the first section and the second section comprise a unitary glass or ceramic body.

4. The multi-fiber splice protector of claim 1, wherein a thermoplastic hotmelt material is arranged in the internal cavity and the internal cavity extension.

5. The multi-fiber splice protector of claim 1, wherein the second section comprises a width of no greater than 3.2 mm.

6. The multi-fiber splice protector of claim 1, further comprising a polymeric layer arranged over the first wall portion extension, the second wall portion extension, and the adjacent first edges of the first and second wall portion extensions.

7. The multi-fiber splice protector of claim 1, wherein the strength member is configured to receive a plurality of fusion spliced optical fibers comprising from two to twelve fusion spliced optical fibers arranged in a one-dimensional array.

8. The multi-fiber splice protector of claim 1, wherein the strength member comprises an overall length of no greater than 25 mm.

9. The multi-fiber splice protector of claim 1, wherein the strength member comprises an overall length, and the first section of the strength member comprises a length that is less than 75% of the overall length.

10. The multi-fiber splice protector of claim 1, wherein the first wall portion and the first wall portion extension are configured as a first flat plate, and the second wall portion and the second wall portion extension are configured as a second flat plate arranged parallel to the first flat plate.

11. A fiber optic cable assembly comprising:
a multi-fiber splice protector according to claim 1;
a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section;
a plurality of fusion splices including a plurality of splice joints joining ends of the stripped sections of the first plurality of optical fibers with ends of the stripped sections of the second plurality of optical fibers to form a plurality of fusion spliced optical fibers;
wherein the plurality of splice joints are arranged in at least one of the internal cavity or the internal cavity extension of the strength member.

12. The fiber optic cable assembly of claim 11, further comprising a multi-fiber push-on (MPO) connector that comprises a multi-fiber ferrule, wherein optical fibers of the first plurality of optical fibers are terminated in the multi-fiber ferrule.

13. The fiber optic cable assembly of claim 12, wherein optical fibers of the first plurality of optical fibers extend a distance of no greater than 20 mm from the multi-fiber ferrule to the plurality of splice joints.

14. The fiber optic cable assembly of claim 12, wherein:
the MPO connector comprises a spring and a spring push member, and
at least a portion of the multi-fiber splice protector extends through (A) a spring aperture defined by the spring, and (B) a spring push member aperture defined by the spring push member.

15. The fiber optic cable assembly of claim 14, further comprising:
a crimp band defining a crimp band aperture, wherein a portion of the spring push member extends into or through the crimp band aperture; and
a boot extending around the crimp band and at least a portion of the spring push member;
wherein a portion of the multi-fiber splice protector is arranged within portions of the spring push member and the crimp band aperture that are laterally surrounded by the boot.

16. The fiber optic cable assembly of claim 15, further comprising a connector housing that receives the multi-fiber ferrule, wherein the boot comprises a push-pull boot that is mechanically engaged with the connector housing.

17. The fiber optic cable assembly of claim 12, wherein the second fiber optic cable section comprises a jacket surrounding the second plurality of optical fibers.

18. The fiber optic cable assembly of claim 12, wherein the second fiber optic cable section comprises a fiber optic ribbon containing the second plurality of optical fibers.

19. A fiber optic cable assembly comprising:
a first fiber optic cable section comprising a first plurality of optical fibers, and a second fiber optic cable section comprising a second plurality of optical fibers, wherein each optical fiber of the first and second pluralities of optical fibers includes a pre-coated section and a stripped section, wherein the second fiber optic cable section comprises a jacket, and wherein a portion of the jacket is split to form a split jacket section;

a plurality of fusion splices including a plurality of splice joints joining ends of the stripped sections of the first plurality of optical fibers with ends of the stripped sections of the second plurality of optical fibers to form a plurality of fusion spliced optical fibers; and a multi-fiber push-on (MPO) connector that comprises a multi-fiber ferrule, a spring, a spring push member, a crimp band, and a boot, wherein optical fibers of the first plurality of optical fibers are terminated in the multi-fiber ferrule, wherein the plurality of splice joints are arranged between the multi-fiber ferrule and a distal end of the boot; and wherein at least a portion of the split jacket section is arranged within the boot;

a multi-fiber splice protector that includes a strength member comprising (a) a first section comprising a U-shaped cross-sectional shape including a first wall portion, a second wall portion arranged parallel to the first wall portion, and a first edge portion connecting adjacent first edges of the first and second wall portions bounding an internal cavity, wherein adjacent second edges of the first and second wall portions opposing the first edges are unconnected; and (b) a second section comprising a first wall portion extension that extends in a longitudinal direction relative to the first wall portion and a second wall portion extension that extends in a longitudinal direction relative to the second wall portion and is arranged parallel to the first wall portion extension to bound an internal cavity extension, wherein adjacent first edges of the first wall portion extension and the second wall portion extension are unconnected, and wherein adjacent second edges of the first wall portion extension and the second wall portion extension that oppose the first edges are unconnected;

wherein the strength member is bend-resistant, and the second edges of the first wall portion, the second wall portion, the first wall portion extension, and the second wall portion extension bound a longitudinal opening permitting the passage of a plurality of spliced optical fibers into the internal cavity and the internal cavity extension;

wherein the fiber optic cable assembly comprises one of the following features (i) to (iv):
  (i) the jacket comprises a split length of no greater than 25 mm;
  (ii) an entirety of the split jacket section is arranged within the boot, and the boot comprises a length of no greater than 33 mm;
  (iii) the fiber optic cable assembly is devoid of heat shrink tubing that both (a) extends from a position within the boot to a position outside the boot, and (b) extends around a circumference of at least a portion of the split jacket section; or
  (iv) the fiber optic cable assembly comprises heat shrink tubing that extends around a circumference of at least a portion of the split jacket section, wherein an aggregate length from a proximal end of the boot to a distal end of the heat shrink tubing is no greater than 33 mm.

20. The fiber optic cable assembly of claim 19, wherein the jacket comprises a split length of no greater than 25 mm.

21. The fiber optic cable assembly of claim 19, wherein an entirety of the split jacket section is arranged within the boot, and the boot comprises a length of no greater than 33 mm.

22. The fiber optic cable assembly of claim 19, wherein the fiber optic cable assembly is devoid of heat shrink tubing that both extends from a position within the boot to a position outside the boot, and extends around a circumference of at least a portion of the split jacket section.

23. The fiber optic cable assembly of claim 19, wherein the fiber optic cable assembly comprises heat shrink tubing that extends around a circumference of at least a portion of the split jacket section, wherein an aggregate length from a proximal end of the boot to a distal end of the heat shrink tubing is no greater than 33 mm.

24. The fiber optic cable assembly of claim 19, wherein the second section comprises a width of no greater than 3.2 mm.

25. The fiber optic cable assembly of claim 19, comprising features (i) and (ii).

26. The fiber optic cable assembly of claim 19, comprising features (i), (ii) and (iii).

27. The fiber optic cable assembly of claim 19, comprising features (i), (ii) and (iv).

28. A method for fabricating a fiber optic cable assembly, the method comprising:
  fusion splicing stripped ends of a first plurality of optical fibers of a first fiber optic cable section with stripped ends of a second plurality of optical fibers of a second fiber optic cable section to form a plurality of splice joints that join the stripped ends of the first and second pluralities of optical fibers to form a plurality of fusion spliced optical fibers;
  arranging a multi-fiber splice protector comprising a strength member around the plurality of splice joints;
  fitting at least a portion of the multi-fiber splice protector through a spring aperture defined by a spring, and through a spring push member aperture defined by a spring push member;
  securing a portion of the second cable assembly to the spring push member with a crimp band; and
  fitting a boot around the crimp band and at least a portion of the spring push member;
    wherein the strength member comprises (i) a first section comprising a U-shaped cross-sectional shape including a first wall portion, a second wall portion arranged parallel to the first wall portion, and a first edge portion connecting adjacent first edges of the first and second wall portions bounding an internal cavity, wherein adjacent second edges of the first and second wall portions opposing the first edges are unconnected; and (ii) a second section comprising a first wall portion extension that extends in a longitudinal direction relative to the first wall portion and a second wall portion extension that extends in a longitudinal direction relative to the first second portion and is arranged parallel to the first wall portion extension to bound an internal cavity extension, wherein adjacent first edges of the first wall portion extension and the second wall portion extension are unconnected, and wherein adjacent second edges of the first wall portion extension and the second wall portion extension that oppose the first edges are unconnected;
  wherein the strength member is bend-resistant, and the second edges of the first wall portion, the second wall portion, the first wall portion extension, and the second wall portion extension bound a longitudinal opening that permits the passage of the plurality of fusion spliced optical fibers into the internal cavity and the internal cavity extension.

29. The method of claim 28, wherein at least a portion of the strength member comprises a maximum width no greater than 3.2 mm.

30. The method of claim 28, wherein a portion of the multi-fiber splice protector is arranged within portions of the spring push member and the crimp band aperture that are laterally surrounded by the boot.

31. The method of claim 28, further comprising securing the plurality of splice joints within the internal cavity and/or the internal cavity extension with a thermoplastic hotmelt material.

32. The method of claim 28, further comprising:
covering the first wall portion extension, the second wall portion extension, and the adjacent first edges of the first and second wall portion extensions with a polymeric tape; and
supplying a thermoplastic hotmelt material into the internal cavity extension while the polymeric tape covers the first wall portion extension, the second wall portion extension, and the adjacent first edges of the first and second wall portion extensions.

33. The method of claim 28, further comprising splitting a jacket of the second fiber optic cable section to form a split jacket section, and securing portions of the split jacket section to the spring push member with the crimp band.

34. The method of claim 33, wherein the jacket comprises a split length of no greater than 25 mm.

\* \* \* \* \*